US008113577B2

(12) United States Patent
Nishiura et al.

(10) Patent No.: US 8,113,577 B2
(45) Date of Patent: Feb. 14, 2012

(54) CABLE CONNECTION STRUCTURES

(75) Inventors: Takeshi Nishiura, Nissin (JP); Atsuki Sasaki, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 249 days.

(21) Appl. No.: 12/602,210

(22) PCT Filed: Dec. 19, 2007

(86) PCT No.: PCT/JP2007/074417
§ 371 (c)(1),
(2), (4) Date: Nov. 30, 2009

(87) PCT Pub. No.: WO2009/001490
PCT Pub. Date: Dec. 31, 2008

(65) Prior Publication Data
US 2010/0183367 A1    Jul. 22, 2010

(30) Foreign Application Priority Data

Jun. 27, 2007  (JP) ................................. 2007-168593

(51) Int. Cl.
*B60N 2/427* (2006.01)
(52) U.S. Cl. .................................. 297/216.12; 74/502.4
(58) Field of Classification Search .................. 297/391,
297/408, 410, 216.12; 74/500.5, 501.5 R,
74/501.6, 502.4, 502.6, 503
See application file for complete search history.

(56) References Cited

U.S. PATENT DOCUMENTS

| 4,241,687 | A | * | 12/1980 | DuBois et al. | ................... | 74/107 |
| 4,637,655 | A | * | 1/1987 | Fourrey et al. | ................. | 297/410 |
| 6,082,817 | A | * | 7/2000 | Muller | ...................... | 297/216.12 |
| 6,340,206 | B1 | * | 1/2002 | Andersson et al. | ...... | 297/216.14 |
| 7,226,124 | B2 | | 6/2007 | Mori et al. | | |
| 7,284,794 | B2 | * | 10/2007 | Yamaguchi et al. | ..... | 297/216.12 |
| 7,641,280 | B2 | * | 1/2010 | Uno et al. | ................. | 297/216.12 |
| 2005/0231018 | A1 | | 10/2005 | Mori et al. | | |
| 2009/0189431 | A1 | | 7/2009 | Abe | | |
| 2009/0267389 | A1 | | 10/2009 | Otsuka | | |
| 2009/0315371 | A1 | * | 12/2009 | Shimizu et al. | .......... | 297/216.12 |

FOREIGN PATENT DOCUMENTS

EP        1586485        10/2005
(Continued)

OTHER PUBLICATIONS

English language Abstract of JP 2005-145184, Jun. 9, 2005.
English language Abstract of JP 2005-104259, Apr. 21, 2005.

(Continued)

*Primary Examiner* — Peter R. Brown
(74) *Attorney, Agent, or Firm* — Greenblum & Bernstein, P.L.C.

(57) ABSTRACT

A connection end portion of an inner member is provided with engagement protrusions, and a connection end portion of a stay is provided with reception grooves capable of axially receiving them. By inserting an operation cable into a tube of a fit-tube portion of an ascent/descent body, the engagement protrusions are axially received in insertion grooves, and are temporarily retained at terminal end portions thereof that are bent in one peripheral direction. When the stay is inserted into the tube of the fit-tube portion, the engagement protrusions are received in the reception grooves, and are transferred to terminal end portions thereof that are bent in the other peripheral direction. Through this operation, an axial connection state is attained in which the operation cable is suspended from the stay, and the headrest is attached to the ascent/descent body to become capable of ascending and descending with respect to the seat back.

2 Claims, 15 Drawing Sheets

| FOREIGN PATENT DOCUMENTS | | |
|---|---|---|
| JP | 2005-22548 | 1/2005 |
| JP | 2005-95237 | 4/2005 |
| JP | 2005-104259 | 4/2005 |
| JP | 2005-145184 | 6/2005 |
| JP | 2005-304565 | 11/2005 |

OTHER PUBLICATIONS

English language Abstract of JP 2005-95237, Apr. 14, 2005.
English language Abstract of JP 2005-22548, Jan. 27, 2005.
English language Abstract of JP 2005-304565, Nov. 4, 2005.

* cited by examiner

CABLE CONNECTION STRUCTURES

TECHNICAL FIELD

The present invention relates to a cable connection structure. More specifically, the present invention relates to a cable connection structure connecting two cables axially to each other.

BACKGROUND ART

A conventional vehicle seat adopts a mechanism which instantaneously moves a headrest forward upon occurrence of a rearward collision of a vehicle in order to support a head of a seated occupant. Here, in a known example of the mechanism which moves the headrest forward as described above, there is utilized an operation cable adapted to be pulled upon receiving a backrest load applied to the seat back from the seated occupant at the time of occurrence of the rearward collision of the vehicle.

This operation cable extends from inside of the headrest through a headrest stay serving as a support rod of the headrest, and is arranged inside of the seat back. Thus, in the case in which the headrest is detachable with respect to the seat back, it is necessary, for example, to divide the operation cable into operation cable portions, separately to arrange the cable portions in the two components beforehand, and connect the end portions of the operation cable portions to each other when attaching the headrest.

In this connection, Japanese Laid-Open Patent Publication No. 2005-304565 discloses a technique in which there is arranged an ascent/descent mechanism which raises and lowers a headrest installed at the upper portion of a seat back to adjust the installation height thereof. According to this disclosure, there is arranged inside the seat back an ascent/descent body driven to be raised and lowered by using an electric motor as a drive source. And, a headrest stay is inserted into the ascent/descent body from the upper portion side of the seat back to be set therein, whereby the headrest is supported so as to be capable of ascending and descending with respect to the seat back.

Thus, there is a need in the art to firmly connect each of the respective connection end portions of the cable portions respectively arranged in the headrest and the seat back through the operation of inserting the headrest stay into the seat back to attach it to the ascent/descent body.

SUMMARY

That is, the present invention provides a cable connection structure in which a first cable and a second cable are axially connected to each other. The axial connection of the two cables is effected via a tubular connection member which is regulated in its axial movement. The connection end portion of the first cable is provided with an engagement protrusion protruding radially outwards. The connection end portion of the second cable has an axially extending reception groove capable of axially receiving the engagement protrusion. The connection end portion of the first cable is inserted into the tube of the connection member from one axial side, whereby the engagement protrusion is axially received along the configuration of an insertion groove formed in a tube wall of the connection member. This insertion groove is configured such that its terminal axial end receiving the engagement protrusion is bent in one peripheral direction; the engagement protrusion is inserted up to the terminal end position of the insertion groove, whereby it is maintained in a state in which its movement in both axial directions with respect to the connection member is regulated. The reception groove formed in the connection end portion of the second cable is configured such that its axial terminal end portion receiving the engagement protrusion is bent in the other peripheral direction so as to be opposite to the configuration of the insertion groove. By inserting the connection end portion of the second cable into the tube of the connection member from the other axial side, the engagement protrusion of the first cable retained in this tube is received axially along the configuration of the reception groove of the second cable. And, when the engagement protrusion is inserted up to the terminal end portion of the reception groove where it is bent in the other peripheral direction, the engagement protrusion is detached from the terminal end portion of the insertion groove of the connection member, and the regulation of its axial movement with respect to the connection member is canceled; at the same time, transition is effected to a state in which its axial movement with respect to the second cable is regulated. In the state in which the engagement protrusion has reached the terminal end portion of the reception groove of the second cable, with its axial movement being regulated, the engagement protrusion is retained at the terminal end portion of the reception groove by virtue of the axially extending groove configuration of the insertion groove formed in the connection member. As a result, the two cables are axially connected to each other, and are integrally moved and operated in the axial direction. The first cable is arranged within the seat back of a vehicle seat. The tubular connection member retaining the connection end portion of the first cable inserted into the tube thereof is provided on an ascent/descent body provided so as to be capable of ascent/descent movement with respect to the seat back. A stay serving as a support rod of a headrest is inserted into the ascent/descent body to be attached thereto, whereby it is possible to vary an installation height of the headrest as it makes an ascent/descent movement. The second cable is arranged so as to be inserted into the tube of the stay from an inside of the headrest. The stay of the headrest is inserted into the seat back from above, and is attached to the ascent/descent body while inserted into the tube of the connection member provided integrally on the ascent/descent body, whereby the two cables are axially connected to each other.

In the construction of this invention, as the connection end portion of the first cable is inserted into the tube of the connection member, the engagement protrusion provided at the connection end portion thereof is received axially along the configuration of the insertion groove formed in the connection member. And, when the engagement protrusion reaches the position of the terminal end of this insertion groove that is bent in one peripheral direction, the first cable is maintained in a state in which its movement in both axial directions with respect to the connection member is regulated. And, with the first cable being thus retained, the connection end portion of the second cable is inserted into the tube of the connection member from the other axial side, whereby the engagement protrusion retained at the terminal end portion of the insertion groove is received axially along the configuration of the reception groove formed in the second cable. And, as the second cable is further inserted and moved, the engagement protrusion is caused to reach the terminal end portion of the reception groove that is bent in the other peripheral direction, whereby the engagement protrusion is detached from the terminal end portion of the insertion groove, and the regulation of the axial movement of the first cable with respect to the connection member is canceled, with the first cable being connected integrally with the second cable in the axial direction. At this time, the engagement protrusion provided on the first cable is guided by the axially extending configuration of the insertion groove to be placed in a state in which it is retained at the terminal end portion of the reception groove. As a result, the two cables are maintained in a state in which they are integrally connected to each other in the axial direction, and it is possible to further insert and move the second cable in the axial direction, with the two cables being axially connected together. In this way, through a movement to cause the connection end portions of the two cables to overlap each other in the axial direction, the engagement protrusion provided on the first cable is engaged at the terminal end portion of the reception groove formed in the second cable that is bent in the peripheral direction, whereby it is possible to firmly connect the connection end portions to each other in the axial direction so that they may not be detached from each other.

The first cable is arranged within the seat back of the vehicle seat, and the second cable is arranged so as to extend from the inside of the headrest to be passed through the tube of the stay. This stay is inserted into the seat back from above to be thereby inserted into and attached to the ascent/descent body in the seat back. As a result, the headrest is installed at the upper position of the seat back in a state in which its installation height with respect to the seat back can be varied as the ascent/descent body makes an ascent/descent movement. At this time, the stay is attached to the ascent/descent body while inserted into the tube of the tubular connection member provided on the ascent/descent body, and, with this stay inserting operation, the two cables are integrally connected to each other in the axial direction. In this way, the above-described cable connection structure is applied to the ascent/descent type headrest attachment structure in which the headrest stay of a vehicle seat is inserted into the seat back to be attached to the ascent/descent body, whereby the connection end portions of the cable portions respectively arranged in both the seat back and the headrest can be firmly connected to each other in the axial direction.

Further, the present invention may adopt the following construction: in the state in which the two cables are integrally connected to each other in the axial direction through the headrest stay inserting operation, the two cables are operated to move integrally in the same direction as the stay is further moved in the inserting direction. And, as the stay is further moved in the inserting direction from the state in which the two cables are axially connected to each other, the stay is integrally engaged with the ascent/descent body.

In the construction of this invention, by inserting the stay of the headrest from above into the seat back, the two cables are first axially connected to each other as the inserting operation proceeds. And, as the inserting operation further proceeds thereafter, the stay is engaged with and attached to the ascent/descent body. In this way, the axial connection of the two cables and the attachment of the stay to the ascent/descent body are effected stepwise as the stay inserting operation proceeds, whereby it is possible to attach the stay to the ascent/descent body through the single action of inserting the stay, with the two cables being reliably connected together in the axial direction.

BEST MODE FOR CARRYING OUT THE INVENTION

In the following, embodiments of the best mode for carrying out the present invention will be described with reference to the drawings.

Embodiment 1

Figure 1:
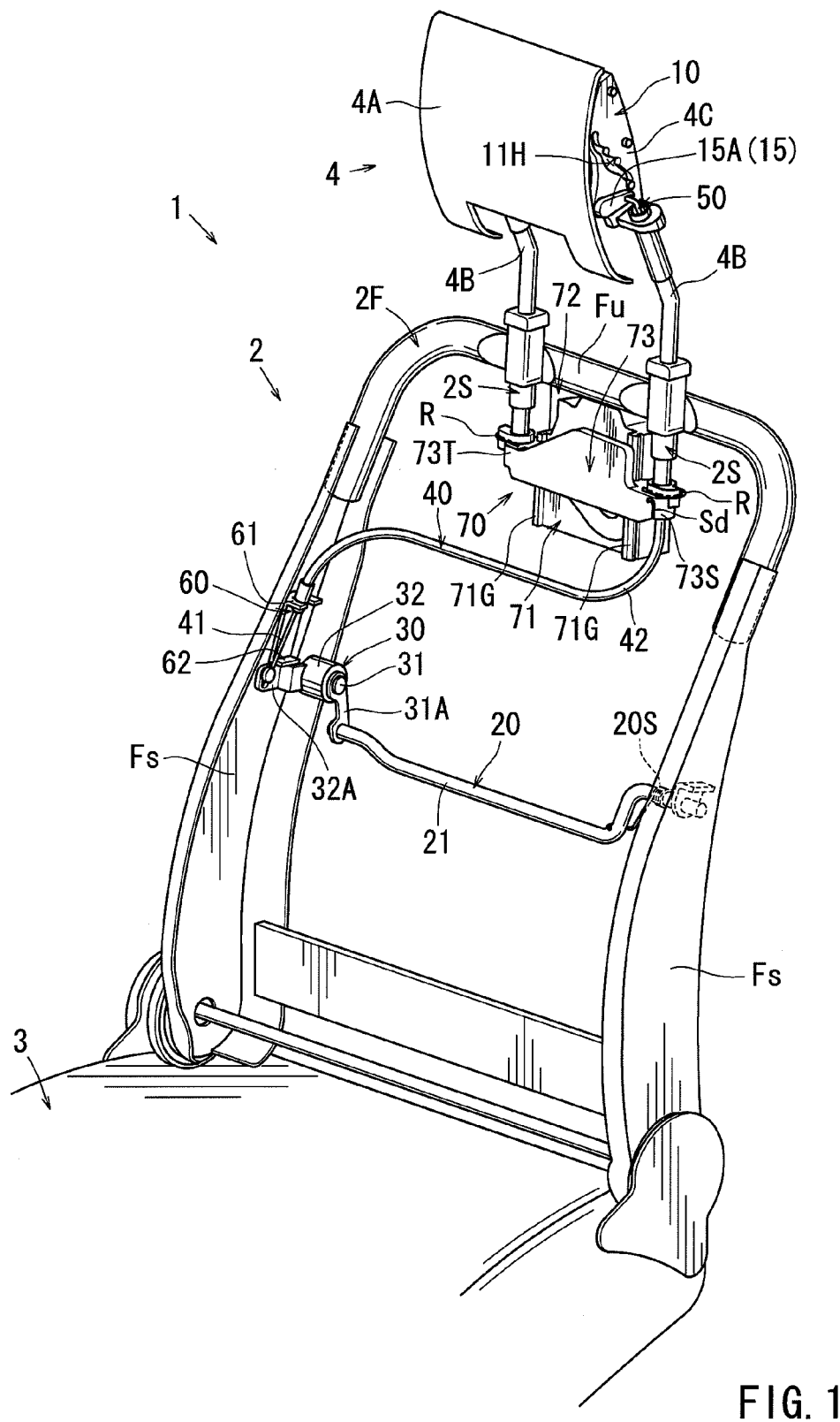
FIG. 1 is a schematic perspective view of the construction of a vehicle seat according to Embodiment 1.

First, a construction of a cable connection structure according to Embodiment 1 will be described with reference to FIGS. 1 to 16. As shown in FIG. 1, the cable connection structure of this embodiment is equipped with a construction for connecting together two cables arranged inside a vehicle seat 1. Here, FIG. 1 is a schematic perspective view of the construction of the vehicle seat 1. The vehicle seat 1 is composed of a seat back 2 constituting a backrest for the seated occupant, a seat cushion 3 constituting the seating portion, and a headrest 4 on which the head is to rest.

In the drawings including FIG. 1, a skin structure is omitted in order to intelligibly illustrate the inner structure of the seat back 2 and the headrest 4. Two bar-like stays 4B and 4B extending from the lower portion of the headrest 4 are respectively inserted into the tubes of tubular supports 2S and 2S provided in the upper surface portion of the seat back 2, whereby the headrest 4 is attached to an ascent/descent device 70 arranged inside the seat back 2 and installed at an upper position of the seat back 2.

As a result, the headrest 4 is mounted so as to be capable of changing its installation height with respect to the seat back 2 as the ascent/descent device 70 is driven. Here, the supports 2S and 2S and the ascent/descent device 70 are mounted and fixed to an upper frame Fu of a back frame 2F constituting the framework of the seat back 2. The upper frame Fu extends between the upper end portions of both side frames Fs and Fs of the back frame 2F and is integrally connected therewith.

Figure 5:
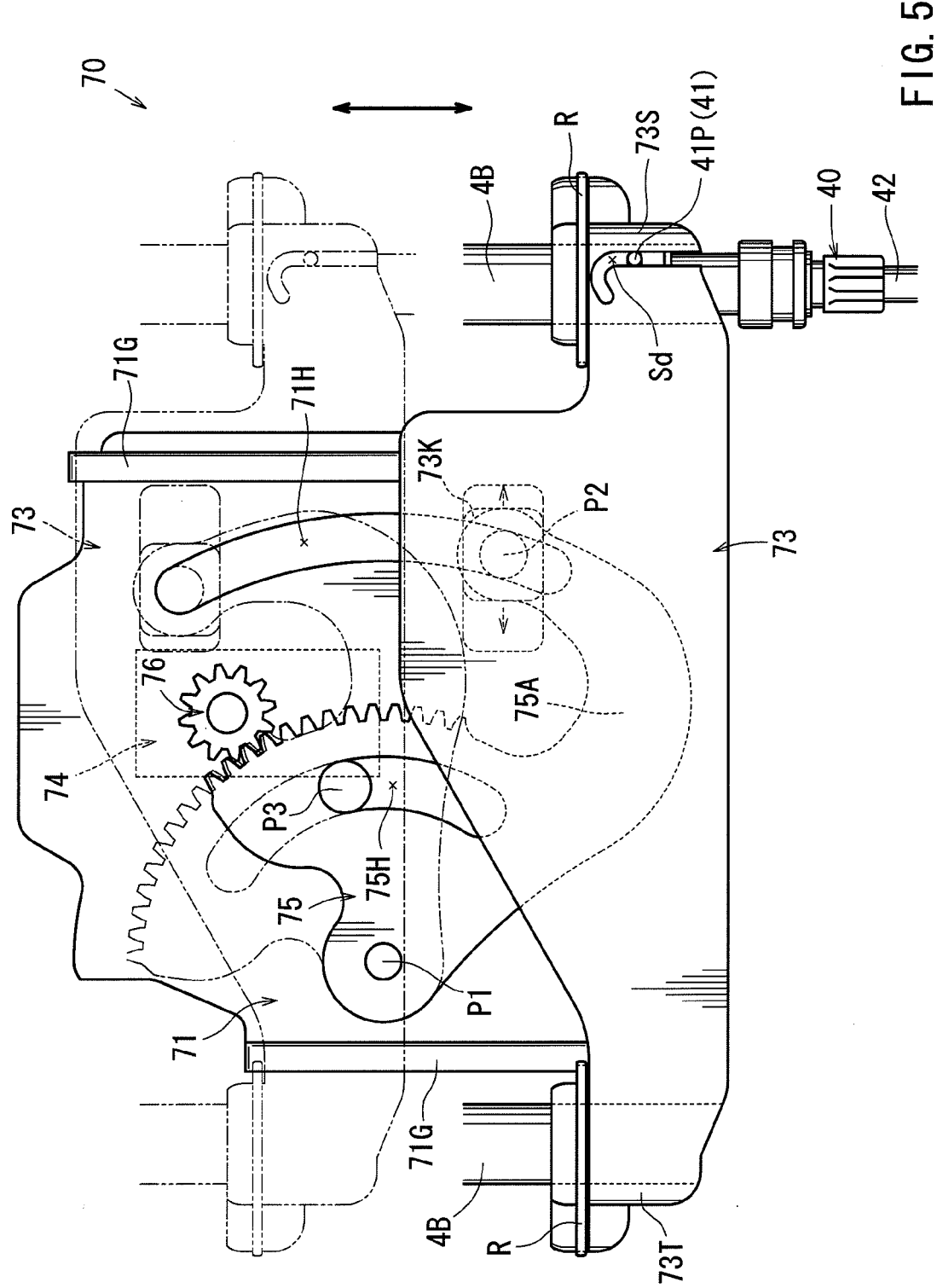
FIG. 5 is a front view of a construction of the ascent/descent device.

As shown in FIG. 5, the ascent/descent device 70 has an ascent/descent body 73 assembled to a plate-like base plate 71 constituting the base thereof. More specifically, the upper edge side portion of the base plate 71 is integrally fastened by means of bolts B to a mounting plate 72 provided on the upper frame Fu in a suspended manner. As a result, the base plate 71 is integrally connected to the back frame 2F.

And, the ascent/descent body 73 is arranged on the front surface side of the base plate 71, and its portions on the rear surface side are slidably fitted into guide portions 71G and 71G formed in edge portions on both sides of the base plate 71 and extending in the vertical direction. As a result, the ascent/descent body 73 can ascend and descend with respect to the base plate 71 along the guide configuration of the guide portions 71G and 71G.

And, at both side end portions of the ascent/descent body 73, there are integrally formed tubular fit-tube portions 73S and 73T into which the stays 4B and 4B of the headrest 4 can be inserted for attachment. The fit-tube portions 73S and 73T are formed as tubes having through-holes through which the stays 4B and 4B can be respectively passed. And, flexible lock rings R and R are fitted and attached onto the outer peripheral portions of the fit-tube portions 73S and 73T.

Figure 14:
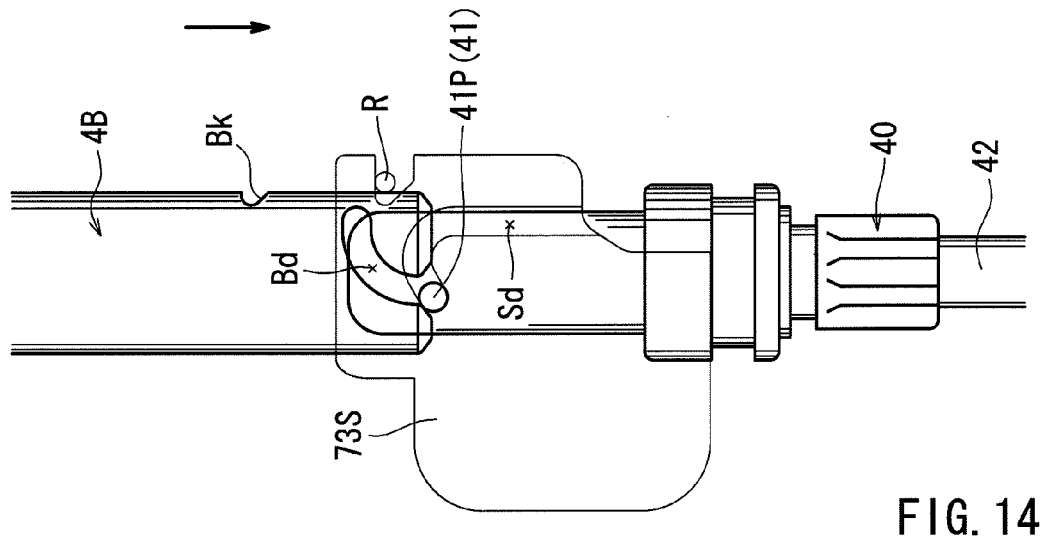
FIG. 14 is a schematic view illustrating how an engagement protrusion is received in a reception groove through stay inserting operation.
Figure 15:
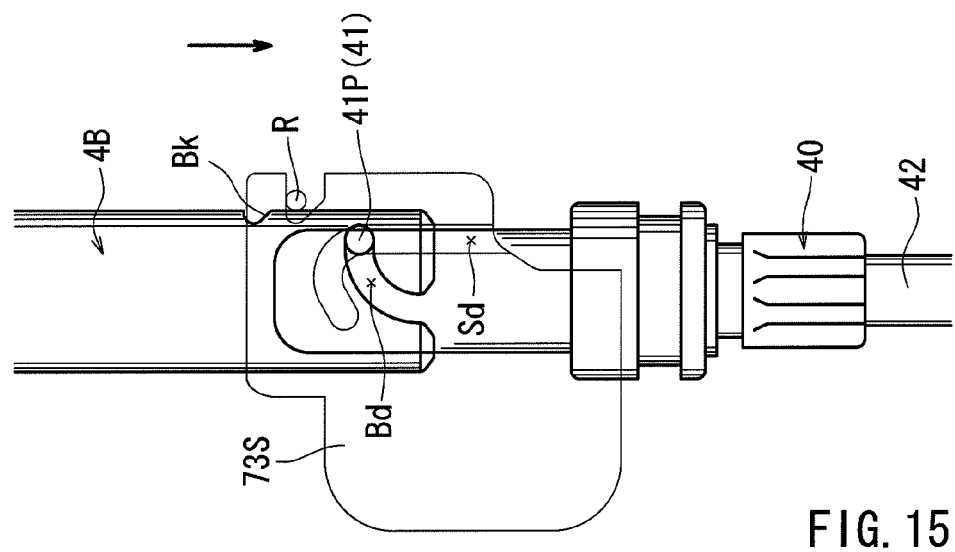
FIG. 15 is a schematic view illustrating how the engagement protrusion reaches a terminal end position of the reception groove through further stay inserting operation.
Figure 16:
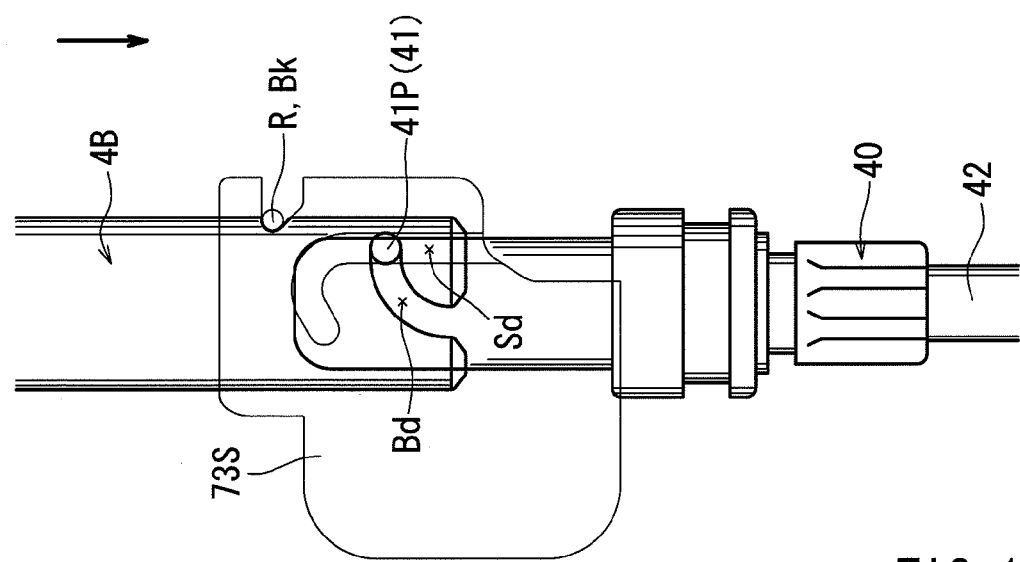
FIG. 16 is a schematic view illustrating how the stay is engaged with the fit-tube portion of the ascent/descent body through further stay inserting operation.

More specifically, the lock rings R and R are respectively fitted into cutout holes Sh and Th formed in wall portions located on the rear surface side of the fit-tube portions 73S and 73T. As a result, the lock rings R and R are retained in a state in which they are fitted into the tubes of the fit-tube portions 73S and 73T by their elastic force. As shown in FIGS. 14 to 16, when the stays 4B and 4B are respectively inserted into the tubes of the fit-tube portions 73S and 73T, the lock rings R and R are pushed away by the tapered lower end portions of the stays 4B and 4B, and then elastically enter lock grooves Bk and Bk formed in the stays 4B and 4B.

As a result, the lock rings R and R are engaged with the stays 4B and 4B, regulating their inserting/detaching movement in the axial direction. As a result, the stays 4B and 4B are integrally attached to the ascent/descent body 73, and the installment height of the headrest 4 can be varied as the ascent/descent body 73 ascends and descends. And, referring back to FIG. 5, between the ascent/descent body 73 and the base plate 71, there is provided a sector gear 75 for raising and lowering the ascent/descent body 73.

The left-hand end portion as seen in the drawing of the sector gear 75 is rotatably connected to the base plate 71 by a connection pin P1, and the ascent/descent body 73 is operated to ascend and descend by being rotated due to a drive force from an electric motor 74. More specifically, the sector gear 75 is connected by inserting a slide pin P2 extending from the ascent/descent body 73 into the distal end portion of an operation arm 75A formed at the right-hand end portion thereof as seen in the drawing.

The slide pin P2 is connected to a slide die 73K provided so as to be slidable in the horizontal direction with respect to the ascent/descent body 73 as seen in the drawing, and is passed in the thickness direction through an operation arm 75A of the above-mentioned sector gear 75, and inserted into an arcuate elongated hole 71H formed in the base plate 71 so as to extend therethrough. As a result, the ascent/descent body 73 can be raised and lowered with the rotation of the sector gear 75 within the range in which the slide pin P2 is slidable within the configuration of the elongated hole 71H.

Here, the sector gear 75 has an arcuate guide hole 75H extending therethrough in the thickness direction. And, a lock pin P3 integrally protruding from the base plate 71 is passed through the guide hole 75H. As a result, the sector gear 75 is rotatable within the range in which the end portions of the guide hole 75H abut the lock pin P3. The sector gear 75 is provided so as to be in mesh with a pinion gear 76 rotated by the electric motor 74 installed on the rear surface portion of the base plate 71.

As a result, as the electric motor 74 is driven to rotate, the driving force thereof is transmitted to the sector gear 75 to rotate the same. Normally, the electric motor 74 is kept out of operation, keeping the rotation of the sector gear 75 at rest. And, by operating a switch (not shown) arranged, for example, at a side portion of the vehicle seat 1, the electric motor 74 is switched between normal and reverse rotation, causing the headrest 4 to ascend and descend.

In order that it may receive the head of the seated occupant at the rear position thereof, the headrest 4 is normally kept at the position where it is installed. However, when rearward collision of the vehicle occurs, a support portion 4A on the front surface side of the headrest 4 receiving the head of the occupant instantaneously moves forward toward the head. That is, when rearward collision of the vehicle occurs, only the support portion 4A of the headrest 4 moves to a position immediately behind the back of the head of the seated occupant, whose body assumes a forwardly tilted attitude so as to be forwardly away from the seat back 2 and the headrest 4.

Figure 6:
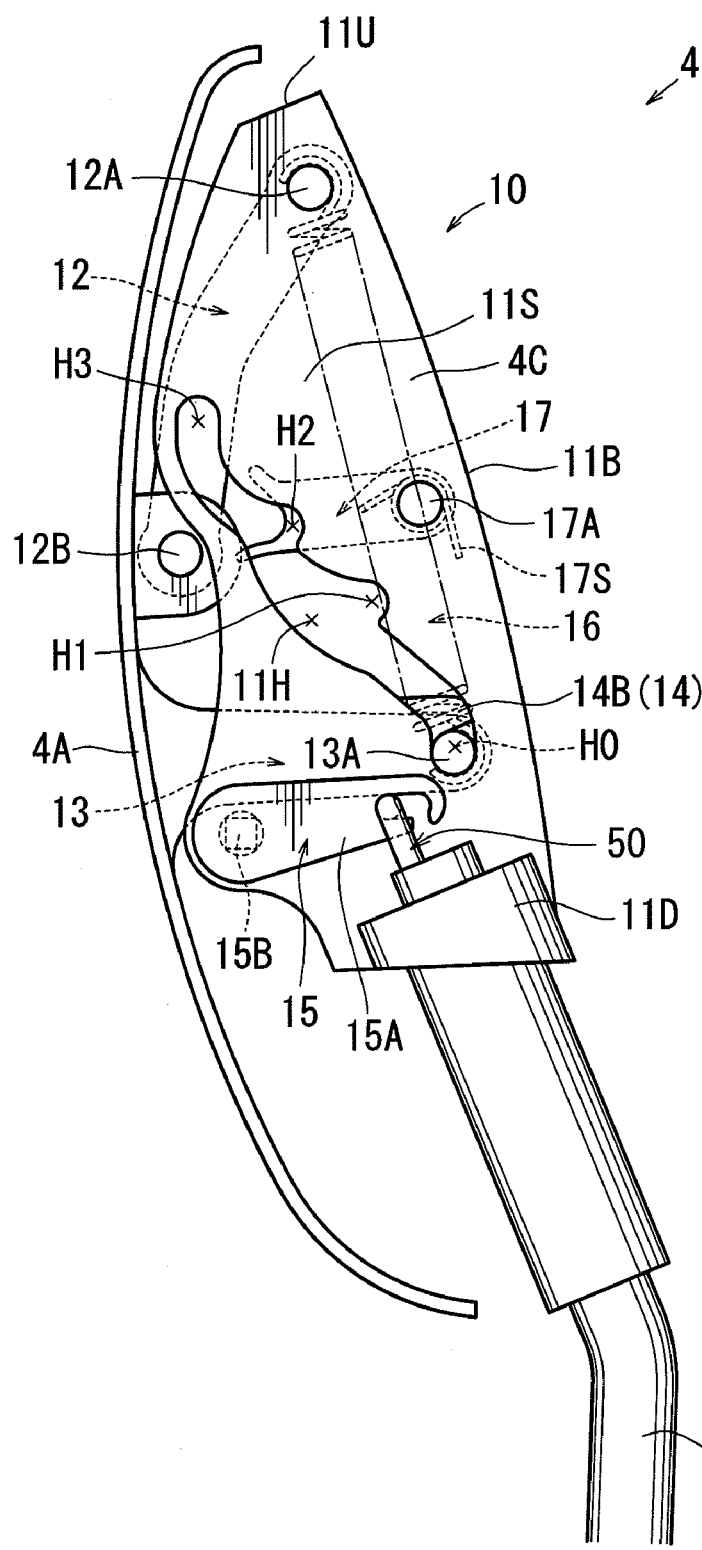
FIG. 6 is a side view of a headrest support portion as retained at an initial position.

As a result, it is possible to prevent the rearward tilting of the head upon occurrence of rearward collision at an early stage to thereby relieve the load applied to the neck portion, thereby preventing a whiplash injury. This operation of moving the support portion 4A forward upon occurrence of rearward collision of the vehicle is effected by a headrest moving mechanism 10 incorporated into the headrest 4. In the normal state prior to occurrence of rearward collision, the headrest moving mechanism 10 retains the support portion 4A in the initial attitude, regulating forward movement of the support portion 4A as shown in FIG. 6.

Here, the support portion 4A is constantly urged so as to move forward toward the head by a tension spring 16 provided between it and a headrest base portion 4C formed integrally with the stays 4B and 4B. Thus, in the normal state prior to occurrence of rearward collision, the support portion 4A is retained at the initial position against the urging force of the tension spring 16. And, upon occurrence of rearward collision of the vehicle, the regulation of the movement of the support portion 4A is canceled, whereby the headrest moving mechanism 10 moves the support portion 4A forward by virtue of the urging force of the tension spring 16.

Figure 9:
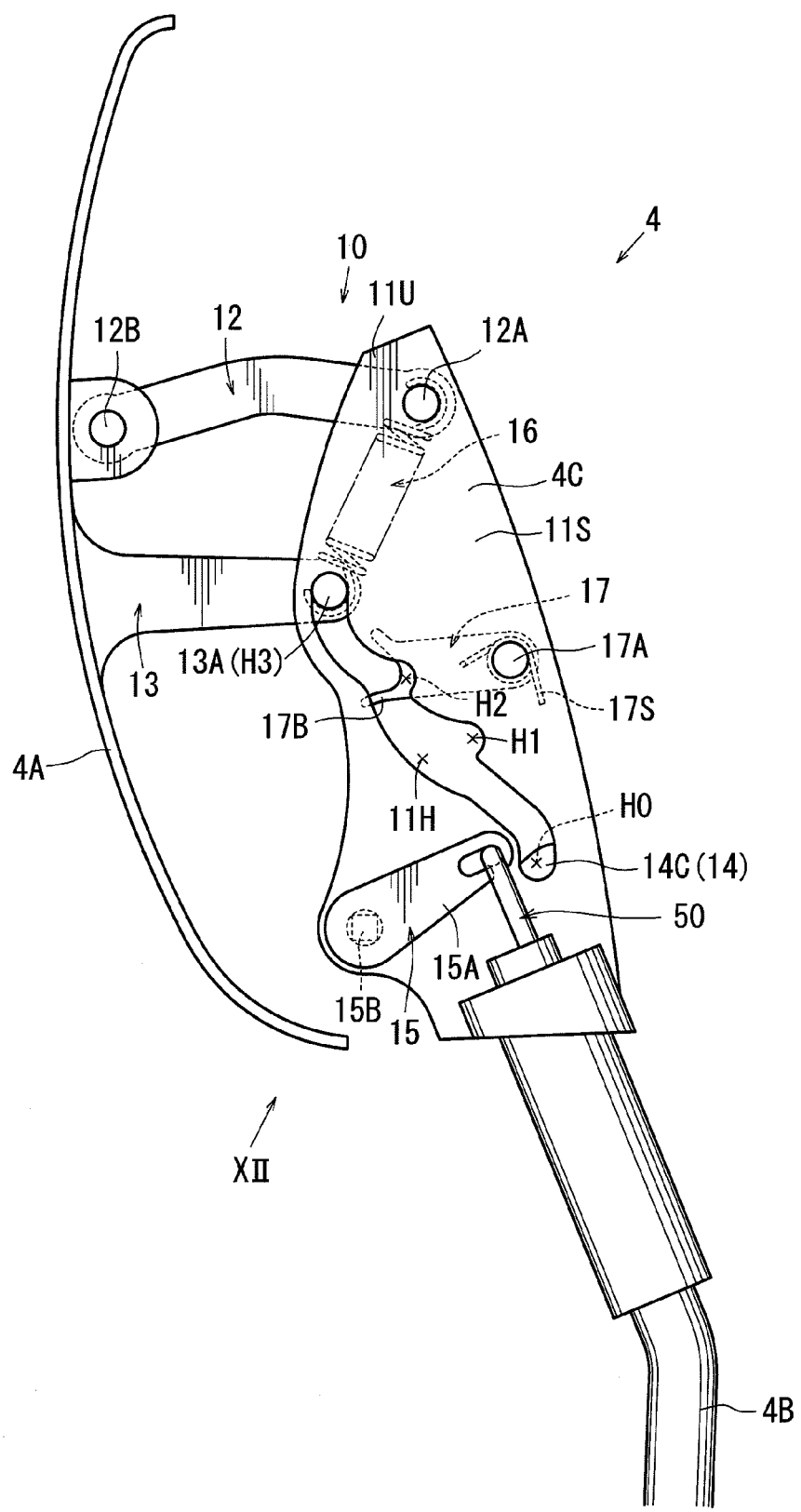
FIG. 9 is a side view of the headrest support portion as having reached a corresponding collision position.

More specifically, the headrest moving mechanism 10 moves the support portion 4A forward and upward along the configuration of elongated holes 11H and 11H formed in the headrest base portion 4C described below, thereby bringing the support portion 4A to a position immediately behind the back of the head (the corresponding collision position) as shown in FIG. 9. Here, in the state in which the support portion 4A has been moved to the corresponding collision position, the headrest moving mechanism 10 is not pushed back even when it receives a load due to the backward tilting of the head at the time of occurrence of rearward collision. As a result, the head of the seated occupant is received in a stable manner by the support portion 4A retained at the corresponding collision position.

Figure 2:
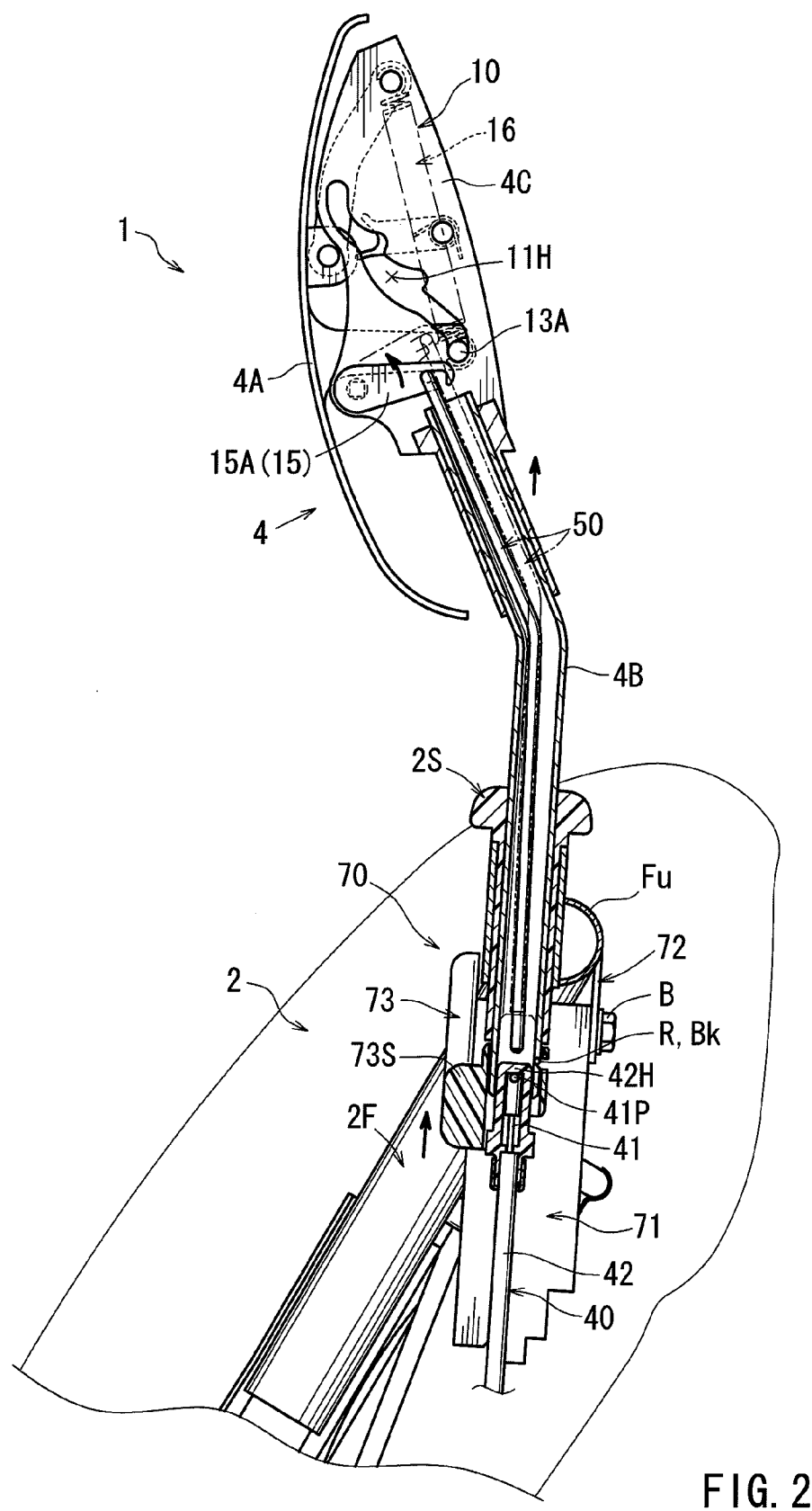
FIG. 2 is a schematic diagram illustrating how a push rod is pushed upwards by an operation cable.

Referring back to FIG. 1, the operation of canceling the movement regulation of the support portion 4A is effected by pushing up a push rod 50 inserted into the tube of the right-hand side stay 4B of the headrest 4. Here, the above-mentioned stay 4B corresponds to a second cable according to the present invention. As shown in FIG. 2, the upper end portion of the push rod 50 is connected to an engagement/disengagement member 15 provided as an operation member for the headrest moving mechanism 10.

Figure 4:
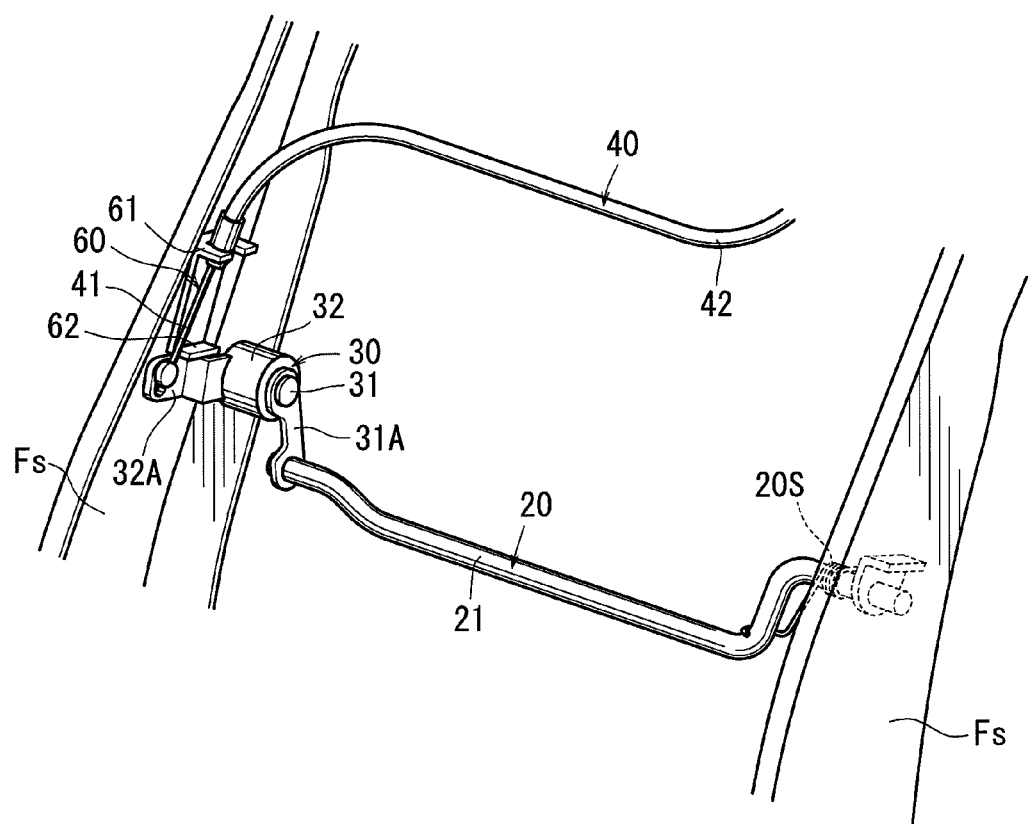
FIG. 4 is an enlarged perspective view of a detection device at a time of rearward collision of a vehicle.

And, the lower end portion of the push rod 50 is connected to the upper end portion of an operation cable 40 arranged inside the seat back 2. Here, the operation cable 40 corresponds to a first cable according to the present invention. As shown in FIG. 4, the lower end portion of the operation cable 40 is connected to a pressure receiving member 20 arranged inside the seat back 2 and serving as a detection device at the time of rearward collision of the vehicle; upon occurrence of rearward collision, the operation cable 40 is pulled downwards.

And, as shown in FIG. 2, when the lower end portion of the operation cable 40 is pulled, the operational force is reversely transmitted to the upper end portion thereof, pushing up the push rod 50. And, when the push rod 50 is thus pushed up as seen in the drawing, the engagement/disengagement member 15 is pushed and rotated counterclockwise as seen in the drawing, thereby canceling the regulation of the movement of the support portion 4A.

Here, the construction of the detection device for pushing the push rod 50 at the time or rearward collision of the vehicle will be described. As shown in FIG. 4, within and halfway up the seat back 2, there is arranged the pressure receiving member 20 in the form of a bent bar extending in the width direction. The right-hand end portion of the pressure receiving member 20 as seen in the drawing is rotatably supported by the right-hand side frame Fs of the seat back 2.

And, the left-hand end portion as seen in the drawing of the pressure receiving member 20 is rotatably supported by the left-hand side frame Fs through the intermediation of a rotary damper 30. The portion of the pressure receiving member 20 situated in the middle with respect to the width direction is formed as a pressure receiving portion 21 receiving the backrest load of the seated occupant. The pressure receiving portion 21 is bent downwards from the right-hand end as seen in the drawing, and is decentered from the rotation center thereof.

As a result, the pressure receiving member 20 receives the backward pushing movement due to the backrest load of the seated occupant as a pushing/rotating movement using both end portions thereof as fulcrums. Here, a torsion spring 20S is provided between the right-hand end portion as seen in the drawing of the pressure receiving member 20 and the side frame Fs. The torsion spring 20S is provided in a previously biased state, urging the receiving member 20 to rotate so as to push out the pressure receiving portion 21 forward.

As a result, the pressure receiving member 20 is normally maintained in an attitude in which it presses the pressure receiving portion 21 against a cushion pad (not shown) provided on the backrest surface of the seat back 2. And, the damper 30 connected to the left-hand end as seen in the drawing of the pressure receiving member 20 is of a well-known rotary damper structure. That is, in the damper 30, a rotation shaft 31 is inserted into a case 32 of a cylindrical configuration, with the rotation shaft 31 and the case 32 being assembled together so as to be capable of relative rotation.

The rotation shaft 31 has a connection arm 31A formed at the right-hand end thereof as seen in the drawing, and the left-hand end portion as seen in the drawing of the pressure receiving member 20 is integrally connected to the connection arm 31A. And, the left-hand end portion as seen in the drawing of the rotation shaft 31 is rotatably supported by the left-hand side frame Fs. As a result, the case 32 is rotatably supported by the rotation shaft 31 with respect to the side frame Fs. And, the case 32 has on the outer peripheral surface portion thereof an operation arm 32A, on which is hooked the lower end portion of an inner member 41 of the operation cable 40 described below.

The operation arm 32A of the case 32 abuts a stopper 62 of a mounting bracket 60 provided on the side frame Fs, whereby its movement in the direction in which it abuts the stopper 62 is regulated. The interior of the case 32 is filled with a viscous fluid such as silicone oil in a sealed state. As a result, with respect to the movement to rotate the rotation shaft 31 relative to the case 32, there is imparted therebetween a viscous drag in correspondence with its rotation speed.

This viscous drag is exerted between the rotation shaft 31 and the case 32; the higher the rotation speed of the rotation shaft 31, the larger the viscous drag, and, the lower the rotation speed, the smaller the viscous drag. And, in the case in which the viscous drag exerted is large, the power of the rotation shaft 31 is easily transmitted to the case 32; and, in the case in which the viscous drag exerted is small, it is difficult for the power of the rotation shaft 31 to be transmitted to the case 32. When the seated occupant makes a movement to lean against the seat back 2, the pressure receiving member 20 and the damper 30, constructed as described above, operate as follows.

First, when, in the normal state prior to rearward collision of the vehicle, the seated occupants leans against the seat back 2, the pressure receiving member 20 is pushed and rotated rearwards at a relatively gentle speed upon receiving the behavior of the seated occupant. Thus, in this case, the rotation shaft 31 rotates at a relatively gentle speed relative to the case 32, so that the viscous drag exerted is small, and the rotation shaft 31 idles within the case 32, with the rotational force of the rotation shaft 31 not being transmitted to the case 32.

However, when, as a result of occurrence of rearward collision of the vehicle, the seated occupants collides with the seat back 2 with momentum, the pressure receiving member 20 receives that powerful movement, and is pushed and rotated rearwards at a relatively abrupt speed. Thus, in this case, the rotation shaft 31 makes a relative rotation at a relatively high speed, so that the above-mentioned viscous drag exerted is large, and the case 32 receives power transmission from the rotation shaft 31 to rotate integrally therewith.

As a result, the case 32 performs pulling operation so as to downwardly draw in the lower end portion of the inner member 41 of the operation cable 40 hooked on the operation arm 32A. And, as shown in FIG. 2, when the lower end portion of the inner member 41 of the operation cable 40 is pulled, this operational force is transmitted to the upper end portion of the inner member 41, and the push rod 50 is pushed upwards.

Figure 3:
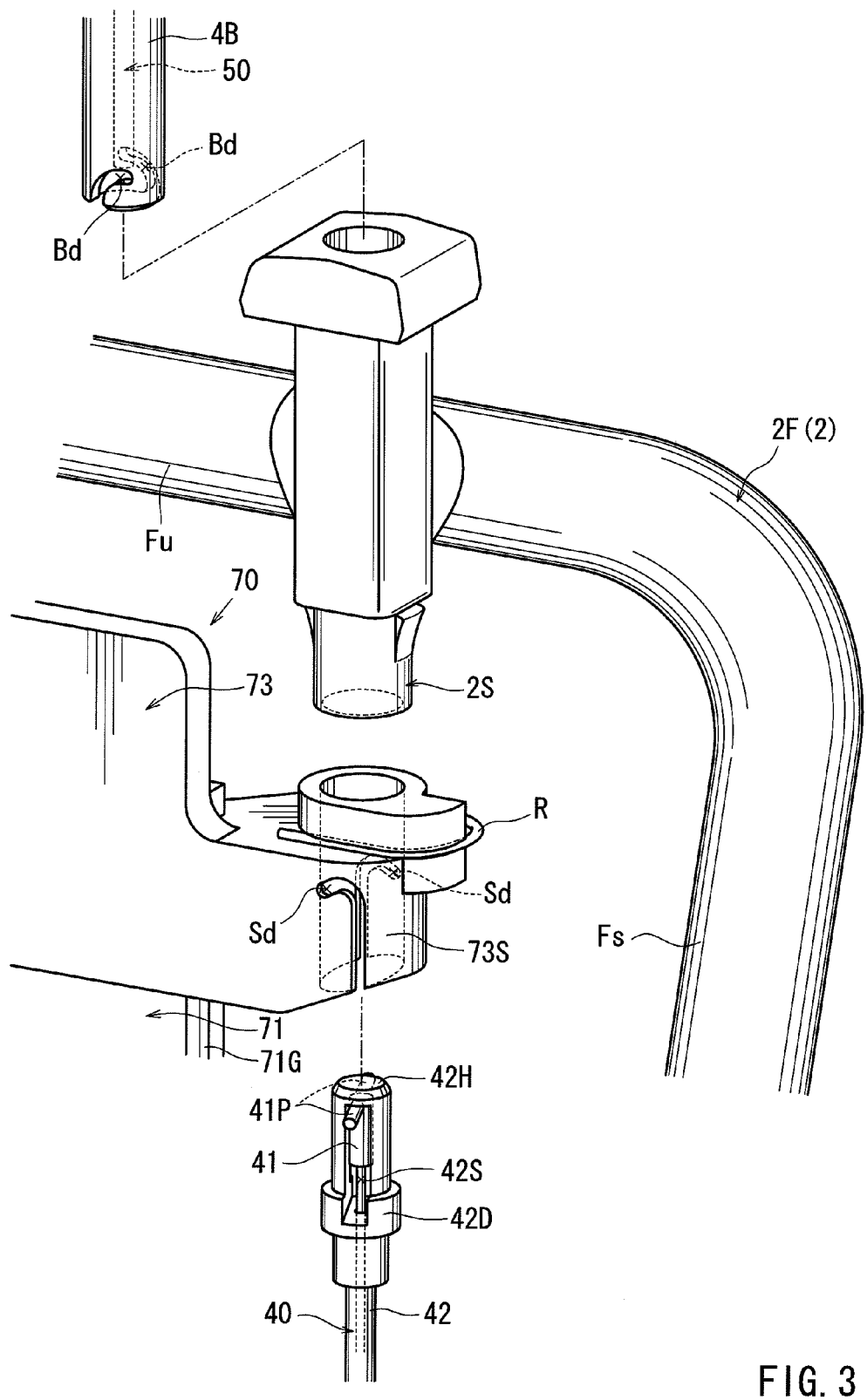
FIG. 3 is an enlarged perspective view illustrating how a headrest stay and the operation cable are inserted into a fit-tube portion of an ascent/descent body.

Next, the way the operational force is transmitted from the operation cable 40 to the push rod 50 will be described. Here, the operation cable 40 is of a double structure in which there is inserted into a flexible tubular outer member 42 the linear inner member 41 whose flexibility is higher than that of the outer member 42. As shown in FIG. 3, the operation cable 40 is routed inside the configuration of the seat back 2, and the lower end portion of the inner member 41 is hooked on the operation arm 32A of the damper 30 described above.

And, the lower end portion of the outer member 42 is hooked on an outer mounting portion 61 of the mounting bracket 60 provided on the left-hand side frame Fs as seen in the drawing. As a result, at the time of occurrence of rearward collision of the vehicle, the operation cable is pulled such that the lower end portion of the inner member 41 is drawn out of the lower end portion of the outer member 42. As shown in FIGS. 2 and 3, the upper end portion of the operation cable 40 is inserted from below into one fit-tube portion 73S of the above-mentioned ascent/descent body 73, whereby the assembly is effected such that the push rod 50 in the tube of the stay 4B inserted from above into the fit-tube portion 73S allows pushing operation.

More specifically, as shown in FIG. 3, the operation cable 40 is constructed such that T-shaped engagement protrusions 41P and 41P formed on the upper end portion of the inner member 41 protrude radially outwards through elongated holes 42S and 42S formed in the upper-end-side peripheral wall of the outer member 42. As a result, the inner member 41 can move in the axial direction relative to the outer member 42 within the range in which the T-shaped engagement protrusions 41P and 41P can move within the elongated holes 42S and 42S.

Figure 13:
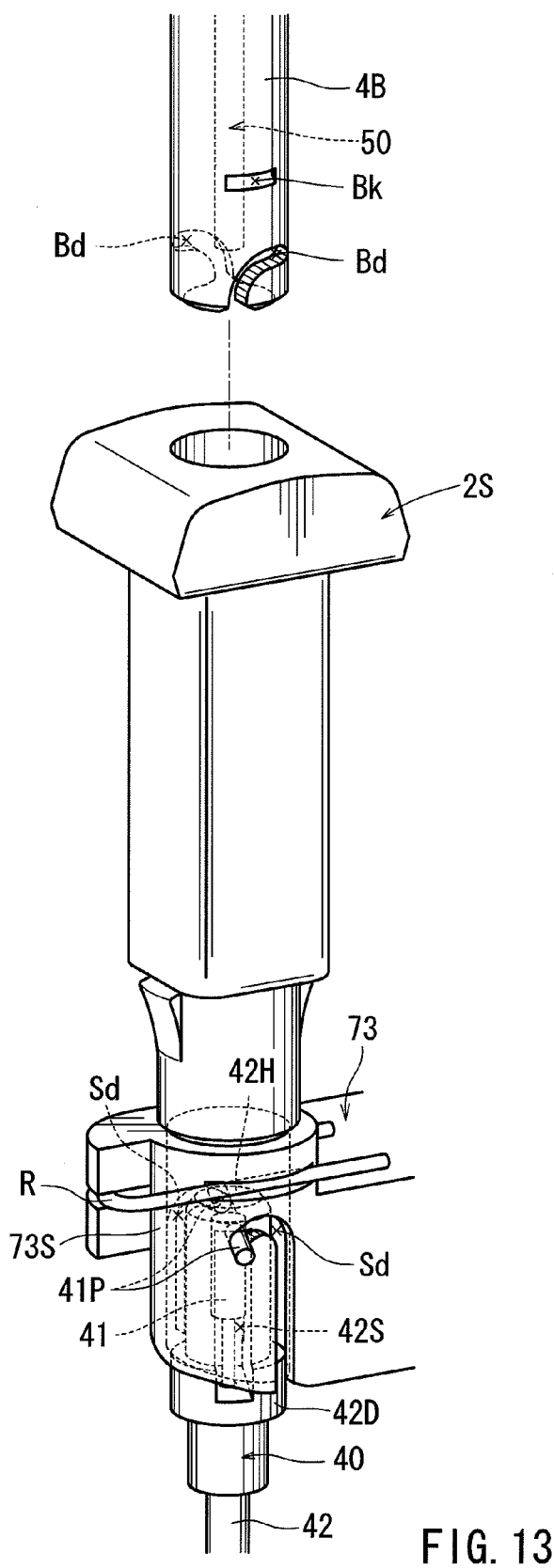
FIG. 13 is a perspective view of the stay in a state prior to its attachment to the ascent/descent body.

The engagement protrusions 41P and 41P and the elongated holes 42S and 42S are formed at two peripheral positions in axis symmetry of each of the inner member 41 and the outer member 42. And, at the upper end portion of the outer member 42, there is formed a head portion 42H so as to stop the tubular end portion configuration. As shown in FIG. 13, the upper end portion of the operation cable 40, constructed as described above, is inserted from below into the tube of the fit-tube portion 73S, whereby the upper end portion is temporarily retained so as to be suspended from the fit-tube portion 73S.

And, in this suspended state, the stay 4B is inserted from above into the tube of the fit-tube portion 73S, whereby transition can be effected from the state in which the operation cable 40 is suspended from the fit-tube portion 73 to the state in which it is suspended from the stay 4B. And, by thus placing the operation cable 40 in the state in which it is suspended from the stay 4B, the operational force with which the lower end of the operation cable 40 is pulled can be reversed and transmitted to the push rod 50 inside the stay 4B as a pushing operational force.

The above construction will be described in detail with reference to FIG. 3: first, the peripheral wall of the fit-tube portion 73S has slit-like insertion grooves Sd and Sd extending axially upwards from the lower end portion thereof. The insertion grooves Sd and Sd are formed at two peripheral positions of the fit-tube portion 73S so as to be in axis symmetry, and the engagement protrusions 41P and 41P formed on the inner member 41 of the operation cable 40 are received by the groove-shaped configuration and are passed in the axial direction.

Here, the terminal end portions on the upper end side as seen in the drawing of the insertion grooves Sd and Sd, which receive the engagement protrusions 41P and 41P, are configured so as to be peripherally curved to the right and left as seen in the drawing. More specifically, the terminal end portion of the insertion groove Sd on the front side as seen in the drawing, indicated by the solid line, is configured so as to be curved to the left as seen in the drawing. And, the terminal end portion of the insertion groove Sd on the back side, indicated by the broken line, is configured so as to be curved to the right as seen in the drawing in axis symmetry with respect to the insertion groove Sd on the front side.

The terminal end portions of the peripherally curved insertion grooves Sd and Sd are configured so as to droop below the horizontal line. As a result, the engagement protrusions 41P and 41P (the operation cable 40) inserted up to the terminal end positions of the insertion grooves Sd and Sd are retained in a stable manner in a state in which they are suspended from the fit-tube portion 73S so that they may not drop due to their own weight.

The engagement protrusions 41P and 41P provided at the upper end portion of the inner member 41 are put into the interior of the insertion grooves Sd and Sd, and, in this state, the operation cable 40 is further inserted into the tube of the fit-tube portion 73S by being passed upwards (in the axial direction). And, when the engagement protrusions 41P and 41P reach the terminal end positions in the axial direction of the insertion grooves Sd and Sd, the operation cable 40 is rotated in the peripheral direction in conformity with the curved configuration of the terminal end portions.

As a result, as shown in FIG. 13, the engagement protrusions 41P and 41P reach the terminal end positions of the insertion grooves Sd and Sd where they are peripherally curved, and the operation cable 40 is suspended from the fit-tube portion 73S. And, as shown in FIG. 13, the stay 4B, which is inserted from above into the tube of the fit-tube portion 73S, has in the peripheral wall thereof slit-like reception grooves Bd and Bd extending axially upwards from the lower end portion thereof. The reception grooves Bd and Bd are formed at two peripheral positions of the stay 4B in axis symmetry with respect to each other.

By inserting the stay 4B from above into the tube of the fit-tube portion 73S, the reception grooves Bd and Bd receive in their groove configuration the engagement protrusions 41P and 41P of the inner member 41 of the operation cable 40 suspended in the tube of the fit-tube portion 73S. And, by further inserting the stay 4B from the state in which the engagement protrusions 41P and 41P are received, the engagement protrusions 41P and 41P are inserted upwardly (axially) along the configuration of the reception grooves Bd and Bd.

Here, the terminal end configuration of the reception grooves Bd and Bd shown on the upper side in the drawing, which receive the engagement protrusions 41P and 41P are configured so as to be peripherally curved in directions opposite to those of the insertion grooves Sd and Sd formed in the fit-tube portion 73S described above. The peripherally curved reception grooves Bd and Bd are configured so as to be gently curved from the axial direction to the horizontal direction. As a result, due to the axial force-in operational force with which the stay 4B is inserted into the tube of the fit-tube portion 73S, the engagement protrusions 41P and 41P in the tube of the fit-tube portion 73S are smoothly received up to the terminal end positions of the reception grooves Bd and Bd, where they are directed in the horizontal direction.

Thus, as shown in FIGS. 14 and 15, by inserting the stay 4B from above into the tube of the fit-tube portion 73S, the engagement protrusions 41P and 41P are peripherally rotated while guided by the curved configuration of the reception grooves Bd and Bd formed in the stay 4B. As a result from the state in which the engagement protrusions 41P and 41P are retained at the terminal end positions of the insertion grooves Sd and Sd, they are drawn back so as to be brought out of this state.

And, the engagement protrusions 41P and 41P reach the terminal end positions of the reception grooves Bd and Bd while guided by the curved configuration of the reception grooves Bd and Bd, whereby they are drawn back to the portions of the insertion grooves Sd and Sd where they extend in the axial direction. As a result, transition is effected from the state in which the engagement protrusions 41P and 41P are suspended in the fit-tube portion 73S, with their axial movement being regulated, to the state in which the engagement protrusions 41P and 41P are suspended from the stay 4B, with their axial movement with respect to the stay 4B being regulated.

As a result, the regulation of the axial movement of the engagement protrusions 41P and 41P with respect to the fit-tube portion 73S is canceled, and the engagement protrusions 41P and 41P are brought into a state in which their axial movement with respect to the stay 4B is regulated. At this time, the engagement protrusions 41P and 41P are situated in the portions of the insertion grooves Sd and Sd extending in the axial direction, so that their movement in the peripheral direction is regulated. As a result, the engagement protrusions 41P and 41P are guided by the axially extending groove configuration of the insertion grooves Sd and Sd, and are retained at the terminal end positions of the reception grooves Bd and Bd.

As a result, the inner member 41 of the operation cable 40 and the stay 4B are integrally connected to each other in the axial direction, and can move integrally together in the axial direction with respect to the fit-tube portion 73S. This axial connection of the inner member 41 and the stay 4B is effected at the insertion position before the stay 4B is engaged with the lock ring R attached to the fit-tube portion 73S. In this state in which the inner member 41 and the stay 4B are axially connected to each other, further inserting movement of the stay 4B is possible as described above.

Thus, as shown in FIG. 16, by further inserting the stay 4B in this axial connection state, it is possible to engage the lock ring R with the stay 4B and to attach the stay 4B to the ascent/descent body 73 while maintaining the above-mentioned axial connection state. That is, through the single action of inserting the stay 4B, it is possible to reliably complete the axial connection of the inner member 41 and the stay 4B and then attach the stay 4B to the ascent/descent body 73.

By connecting the lower end portion of the stay 4B and the upper end portion of the inner member 41 axially to each other through the operation of inserting the stay 4B, the head portion 42H of the outer member 42 of the operation cable 40 is inserted into the tube of the stay 4B from below. As a result, the lower end portion of the push rod 50 inserted into and arranged in the tube of the stay 4B and the head portion 42H of the outer member 42 are arranged close to each other in the axial direction.

Specifically speaking, a slight gap is formed between the two so that, when inserting the stay 4B, the push rod 50 may not be erroneously pushed against the head portion 42H of the outer member 42. And, in this state, in which the head portion 42H of the outer member 42 and the lower end portion of the push rod 50 are arranged close to each other in the axial direction, the operational force due to the pulling of the operation cable 40 from the lower end side can be reversed and transmitted to the push rod 50 as a pushing operational force by the head portion 42H of the outer member 42, with the two being axially connected to each other.

Next, the headrest moving mechanism 10 will be described. While FIGS. 6 to 12 show the construction of the headrest moving mechanism 10, FIG. 9 best shows the construction of each portion thereof, so that the construction of each portion thereof will be described with reference to this drawing. The headrest moving mechanism 10 is provided such that the support portion 4A is connected to the headrest base portion 4C, and has a pair of connection links 12 and 12 provided in the width direction, support members 13 and 13, hooks 14 and 14, the engagement/disengagement member 15, the tension spring 16, and lever members 17 and 17.

Here, the headrest base portion 4C is formed of synthetic resin as an integral unit composed of a plate-like rear surface portion 11B, a bottom surface portion 11D, side surface portions 11S and 11S, and an upper surface portion 11U. More specifically, the bottom surface portion 11D is formed so as to extend forward from the lower end edge of the rear surface portion 11B. And, the side surface portions 11S and 11S are formed so as to be erect on both sides in the width direction of the headrest base portion 4C. And, the upper surface portion 11U is formed so as to connect the upper edges of both side surface portions 11S and 11S to each other.

Figure 12:
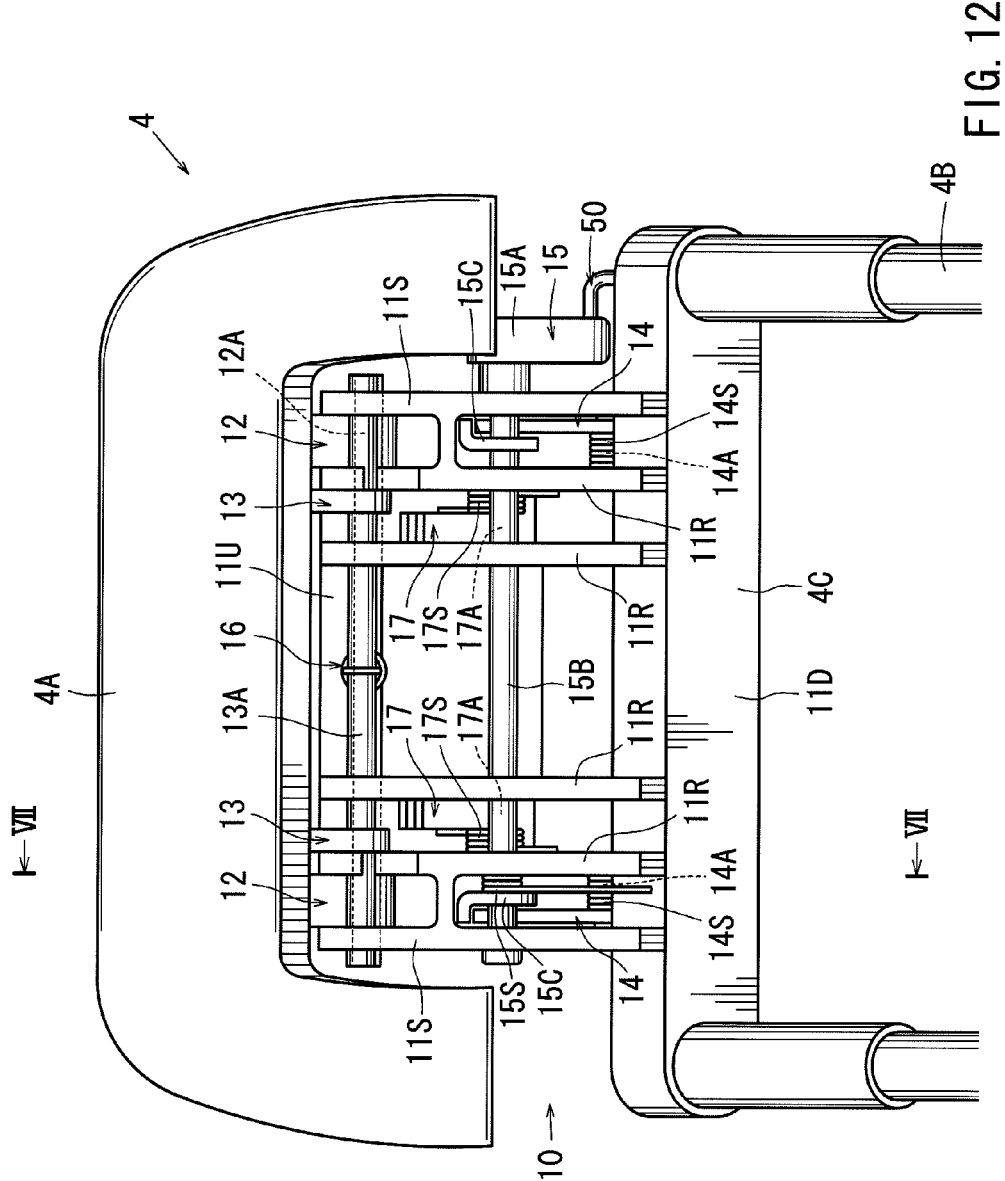
FIG. 12 is a schematic view of the headrest moving mechanism as seen from the direction of the arrow XII of FIG. 9.

Here, FIG. 12 is a view of the headrest as seen from the direction of the arrow XII of FIG. 9, that is, a front view of the headrest 4 as seen obliquely from below. As shown in the drawing, between both side surface portions 11S and 11S of the headrest 4, there are formed a plurality of plate-like erect ribs 11R so as to be parallel thereto, reinforcing the headrest base portion 4C. The upper end portions of the stays 4B and 4B are inserted into the bottom surface portion 11D of the headrest base portion 4C to be integrally fixed thereto.

The stays 4B and 4B are formed in a tubular configuration and are fixed in position, with the opening portions at the upper ends thereof being exposed on the upper surface side of the bottom surface portion 11D. Further, both side surface portions 11S and 11S have undulated elongated holes 11H formed so as to extend therethrough in the thickness direction. The elongated holes 11H and 11H have, between lower end portions H0 and H0 and upper end portions H3 and H3 thereof, first stopper grooves H1 and second stopper grooves H2 recessed stepwise backwards (to the right as seen in the drawing) in a wave-like fashion.

Next, referring again to FIG. 9, the pair of connection links 12 are formed of synthetic resin, and are provided as connection members connecting the headrest base portion 4C and the support portion 4A to each other. The connection links 12 are arranged side by side in the width direction, with their end portions being linked to the near-upper-end portion of the headrest base portion 4C and the rear-surface-side portion of the support portion 4A.

More specifically, the rear end portions of the connection links 12 and 12 are rotatably supported by a connection shaft 12A provided so as to extend through both side surface portions 11S and 11S of the headrest portion 4C. Here, as shown in FIG. 12, the rear end portions of the connection links 12 and 12 are arranged between both side surface portions 11S and 11S and ribs 11R and 11R located at the inner sides of the side surface portions 11S and 11S. And, the connection links 12 and 12 are rotatably supported by the connection shaft 12A extending between both side surface portions 11S and 11S.

And, referring back to FIG. 9, the front end portions of the connection links 12 and 12 are rotatably supported by a connection shaft 12B extending in the width direction at a position on the rear surface side of the support portion 4A. The connection shafts 12A and 12B are arranged parallel to each other. The connection links 12 and 12 are rotated clockwise as seen in the drawing around the connection shaft 12A rotatably supporting the rear end portions of the links 12 and 12, whereby the links 12 and 12 abut the upper surface portion 11U of the headrest base portion 4C, and their clockwise rotation is regulated.

Next, a pair of support members 13 and 13 are formed integrally with the support portion 4A so as to extend rearwards from the rear surface side of the support portion 4A. The support members 13 and 13 are arranged side by side in the width direction of the support portion 4A. Here, the support portion 4A is formed as a curved plate whose front surface side is curved through integral molding of synthetic resin. On the rear surface side of the support portion 4A, integrally formed are the portions for rotatably supporting the connection shaft 12B and the support members 13 and 13.

The rear end portions of the support members 13 and 13 are connected to each other by the connection shaft 13A extending in the width direction. More specifically, as shown in FIG. 12, the rear end portions of the support members 13 and 13 are arranged between ribs 11R and 11R that are arranged on both outer sides of the support members 13 and 13 and ribs 11R and 11R that are arranged on the inner sides of the support members 13 and 13. And, the connection shaft 13A connecting the rear end portions of the support members 13 and 13 to each other are arranged parallel to the connection shaft 12A and the connection shaft 12B mentioned above.

The connection shaft 13A is provided such that its end portions are inserted into the elongated holes 11H and 11H formed in both side surface portions 11S and 11S of the headrest base portion 4C. As a result, the connection shaft 13A can move in a forward-rearward direction and an upper-lower direction solely within the range of the hole configuration of the elongated holes 11H and 11H. Ribs 11R (See FIG. 12) formed between both side surface portions 11S and 11S are configured so as not interfere with the connection shaft 13A moving within the elongated holes 11H and 11H.

Figure 7:
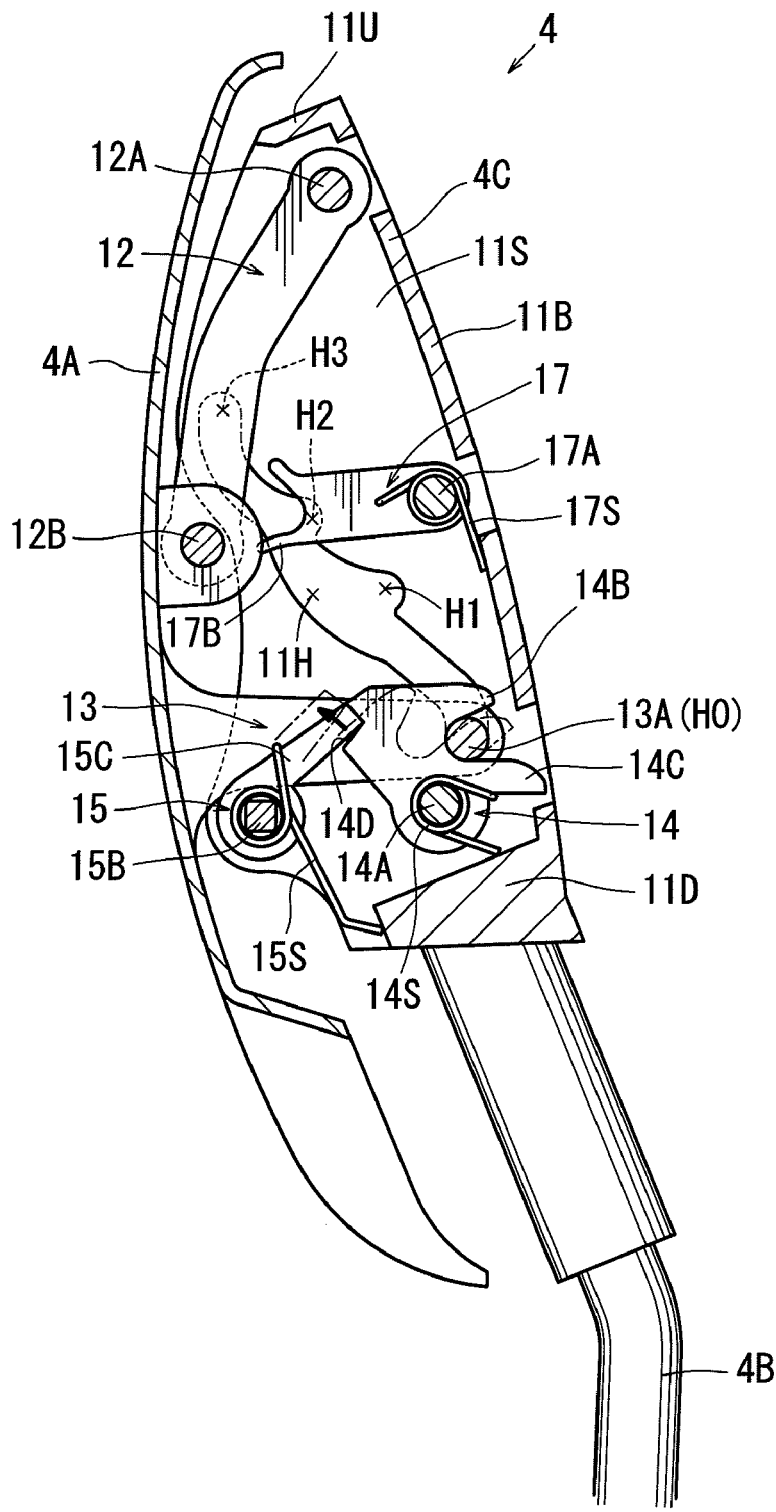
FIG. 7 is a schematic sectional view, taken along the line VII-VII of FIG. 12, of an inner construction of a headrest moving mechanism.

Next, as shown in FIG. 7, a pair of hooks 14 and 14 are generally formed in a cam-like configuration, and are arranged side by side in the width direction at a position near the lower end of the headrest base portion 4C. The hooks 14 and 14 are provided as regulating members for regulating the movement of the connection shaft 13A, which moves within the elongated holes 11H and 11H, to an initial position. More specifically, as shown in FIG. 12, the hooks 14 and 14 are arranged between both side surface portions 11S and 11S and the ribs 11R and 11R on the inner sides thereof, and are rotatably supported by connection shafts 14A and 14A extending therebetween.

And, referring back to FIG. 7, two portions of an outer peripheral surface of each hook 14 and 14 are provided with an upper jaw portion 14B and a lower jaw portion 14C in the form of claws protruding radially outwards. As a result, recesses recessed radially innerwards are formed between the upper jaw portions 14B and 14B and the lower jaw portions 14C and 14C. The recesses between the upper jaw portions 14B and the lower jaw portions 14C accommodate the connection shaft 13A mentioned above. Here, the connection shafts 14A and 14A are arranged so as to be parallel to the connection shafts 12A and 12B and the connection shaft 13A.

And, torsion springs 14S and 14S are respectively provided between the hooks 14 and 14 and the headrest base portion 4C. The torsion springs 14S and 14S are mounted in a previously biased state, urging the hooks 14 and 14 to rotate counterclockwise as seen in the drawing from the position of FIG. 7. And the hooks 14 and 14 have in the outer peripheral edge portions thereof lock grooves 14D of a configuration recessed stepwise.

A pair of engagement arm portions 15C and 15C provided on the engagement/disengagement member 15 described below are respectively engaged with the lock grooves 14D and 14D. As a result, the counterclockwise rotation due to the urging of the hooks 14 and 14 is kept regulated. Thus, in the state in which their counterclockwise rotation is regulated, the hooks 14 and 14, constructed as described above, maintain a state in which the connection shaft 13A is locked to the lower end portions H0 and H0 of the elongated holes 11H and 11H, with the connection shaft 13A being accommodated in the recesses of the upper jaw portions 14B and 14B and the lower jaw portions 14C and 14C.

Here, as shown in FIG. 6, the connection shaft 13A is normally urged so as to be attracted to the connection shaft 12A by the tension spring 16 stretched between the connection shaft 13A and the connection shaft 12A, and is urged toward the upper end portions H3 and H3 along the configuration of the elongated holes 11H and 11H. Thus, normally, the connection shaft 13A is kept locked to the lower end portions H0 and H0 of the elongated holes 11H and 11H (the initial position) by the hooks 14 and 14 against the urging force of the tension spring 16.

And, referring back to FIG. 7, the engagement arm portions 15C and 15C are rotated counterclockwise, and the engagement of the hooks 14 and 14 therewith is canceled, whereby the hooks 14 and 14 are rotated counterclockwise as seen in the drawing by the urging force of the torsion springs 14S and 14S. As a result, as indicated by the phantom line of FIG. 7, the hooks 14 and 14 move the upper jaw portions 14B and 14B out of the elongated holes 11H and 11H, and push up the lower jaw portions 14C and 14C from below to assume an attitude in which they are exposed in the elongated holes 11H and 11H.

Figure 8:
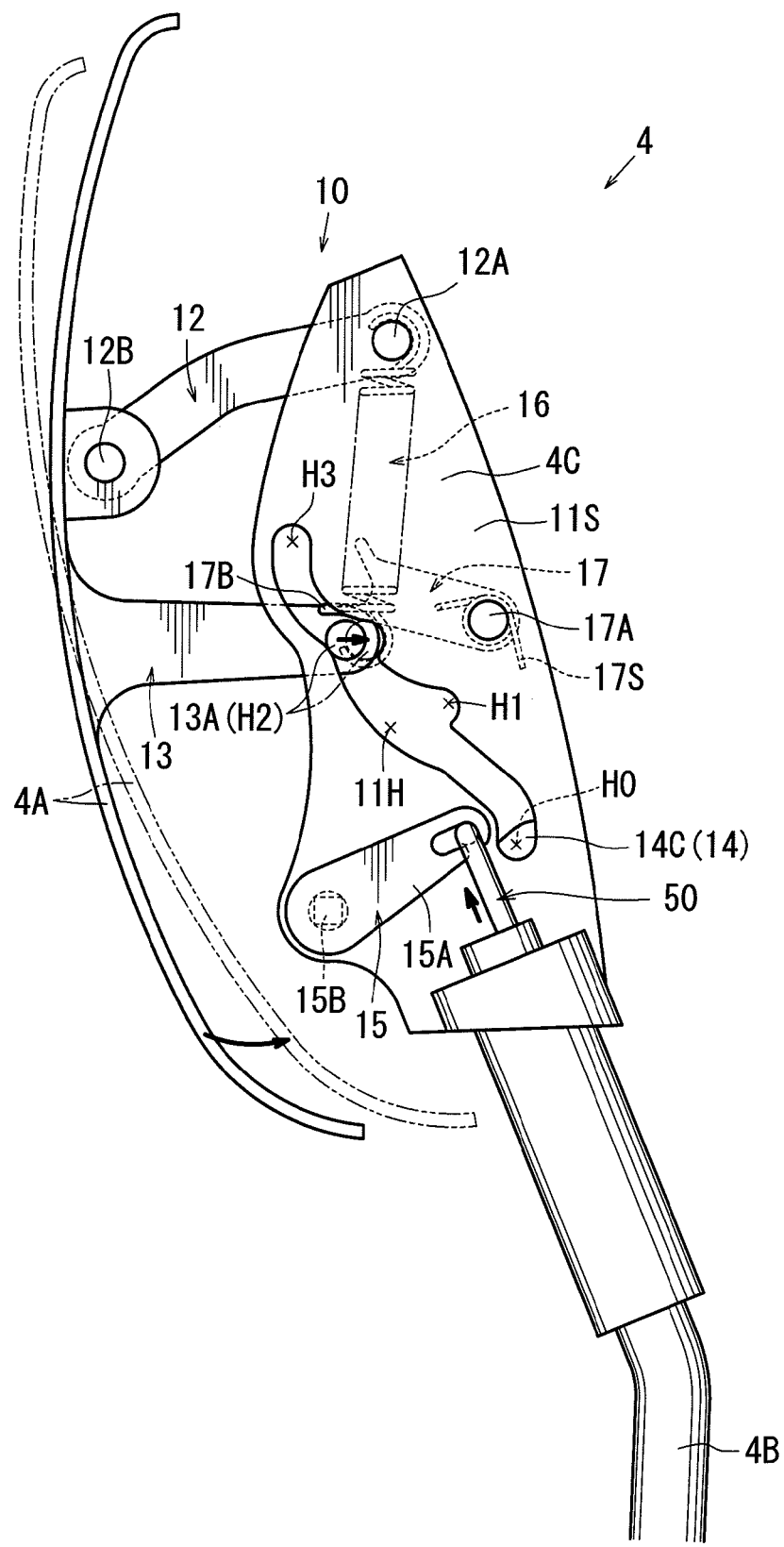
FIG. 8 is a side view of the headrest support portion as being moved toward the head.

As a result, the lock of the connection shaft 13A by the hooks 14 and 14 is canceled, and, as shown in FIGS. 8 and 9, the connection shaft 13A is moved forwards and upwards along the configuration of the elongated holes 11H and 11H by the urging force of the tension spring 16. And, as a result, the support portion 4A moves forwards and upwards relative to the headrest base portion 4C while the connection links 12 and 12 rotate.

Here, referring back to FIG. 7, the engagement arm portions 15C and 15C, which regulate the counterclockwise rotation of the hooks 14 and 14, are arranged side by side in the width direction so as to be capable of being engaged with the hooks 14 and 14. More specifically, as shown in FIG. 12, the engagement arm portions 15C and 15C are arranged, likewise the hooks 14 and 14, between both side surface portions 11S and 11S and the ribs 11R and 11R on the inner sides thereof. And, the engagement arm portions 15C and 15C are rotatably supported by a connection shaft 15B extending through and between both side surface portions 11S and 11S.

The connection shaft 15B is integrally connected with the engagement arm portions 15C and 15C, and are rotatably supported with respect to both side surface portions 11S and 11S. The connection shaft 15B is arranged so as to be parallel to the connection shafts 12A and 12B and the connection shaft 13A. And, between one engagement arm portion 15C and the headrest base portion 4C, there is provided a torsion spring 15S. The torsion spring 15S is mounted in a previously biased state, and, as shown in FIG. 7, urges the engagement arm portions 15C and 15C so as to rotate them clockwise as seen in the drawing.

As a result, the engagement arm portions 15C and 15C are normally maintained in a state in which they are pressed against the outer peripheral surface portions of the hooks 14 and 14 and in which their distal end portions are respectively engaged with the lock grooves 14D, recessed stepwise, of the hooks 14 and 14. In the state in which the engagement arm portions 15C and 15C are engaged with the lock grooves 14D and 14D, they abut each other, mutually regulating their urged rotation.

And, referring back to FIG. 6, an operation arm portion 15A to be rotated by the push rod 50 mentioned above is integrally connected to an end portion of the connection shaft 15B connected to the engagement arm portions 15C and 15C. When, at the time of occurrence of rearward collision of the vehicle, the push rod 50 is pushed upwards, the operation arm portion 15A is rotated counterclockwise as seen in the drawing. As a result, as shown in FIG. 7, the operation arm portion 15A rotates the engagement arm portions 15C and 15C in the same direction to disengage the engagement arm portions 15C and 15C from the hooks 14 and 14.

And, as a result, the retention of the support portion 4A at the initial position is canceled, and the support portion 4A is transported forward and upward by the urging force of the tension spring 16. As shown in FIG. 9, the forward and upward movement of the support portion 4A is regulated and stopped when the connection shaft 13A reaches the upper end portions H3 and H3 of the elongated holes 11H and 11H. And, in the state in which the movement of the support portion 4A has been stopped, the support portion 4A is not pushed back even when it receives a load from the head of the seated occupant.

That is, when the connection shaft 13A reaches the upper end portions H3 and H3 of the elongated holes 11H and 11H, the connection links 12 and 12 connected to the support portion 4A abut the upper surface portion 11U of the headrest base portion 4C, and the clockwise rotation thereof as seen in the drawing is regulated. When, in the state in which their rotation is regulated, there is exerted a force to push the support portion 4A backwards, the connection links 12 and 12 receive the action of the force so as to be pressed against the upper surface portion 11U of the headrest base portion 4C.

Thus, even when the support portion 4A receives the above-mentioned pushing force, the support portion 4A is not pushed back counterclockwise as seen in the drawing, and receives the head of the seated occupant at the corresponding collision position. Further, as shown in FIG. 8, also halfway through its forward movement, the support portion 4A is not pushed back even when it is pushed by the head of the seated occupant. That is, when, halfway through the forward movement of the support portion 4A, there is exerted a force to cause the connection shaft 13A to be pushed backwards, the connection shaft 13A enters first stopper grooves H1 and H1 or second stopper grooves H2 and H2 of the elongated holes 11H and 11H formed so as to be recessed stepwise backwards (to the right as seen in the drawing).

As a result, the movement to push back the connection shaft 13A rearwards is regulated, and the support portion 4A is retained at some mid position halfway through its forward movement. Thus, even when the support position 4A is at some mid position before it reaches the corresponding collision position, the head of the seated occupant can be received by the support portion 4A. FIG. 8 shows the state in which the connection shaft 13A has entered the second stopper grooves H2 and H2.

Here, referring back to FIG. 6, a pair of lever members 17 and 17 formed by arm-like members are arranged on the headrest base portion 4C. The lever members 17 and 17 are arranged side by side in the width direction, and their rear end portions are rotatably supported by the headrest base portion 4C. More specifically, as shown in FIG. 12, the rear end portions of the lever members 17 and 17 are arranged between the ribs 11R and 11R arranged on both outer sides and the ribs 11R and 11R on the inner sides thereof, and are rotatably supported by connection shafts 17A and 17A extending therebetween.

And, torsion springs 17S and 17S are respectively provided between the lever members 17 and 17 and the headrest base portion 4C. As shown in FIG. 6, the torsion springs 17S and 17S are wound around the connection shafts 17A and 17A, having one ends hooked on the lever members 17 and 17, with the other ends hooked on the headrest base portion 4C. As a result, in their free state, the lever members 17 and 17 are maintained in an attitude in which they are exposed in the elongated holes 11H and 11H due to the action of the spring force of the torsion springs 17S and 17S.

Spoon-shaped receiving portions 17B are respectively formed at the distal ends on the left-hand side as seen in the drawing of the lever members 17 and 17 exposed in the elongated holes 11H and 11H. As shown in FIG. 8, when the connection shaft 13A moves upwards within the elongated holes 11H and 11H from the lower end portions H0 and H0, the receiving portions 17B and 17B are pushed away by the connection shaft 13A, and are forced out of the elongated holes 11H and 11H.

Figure 10:
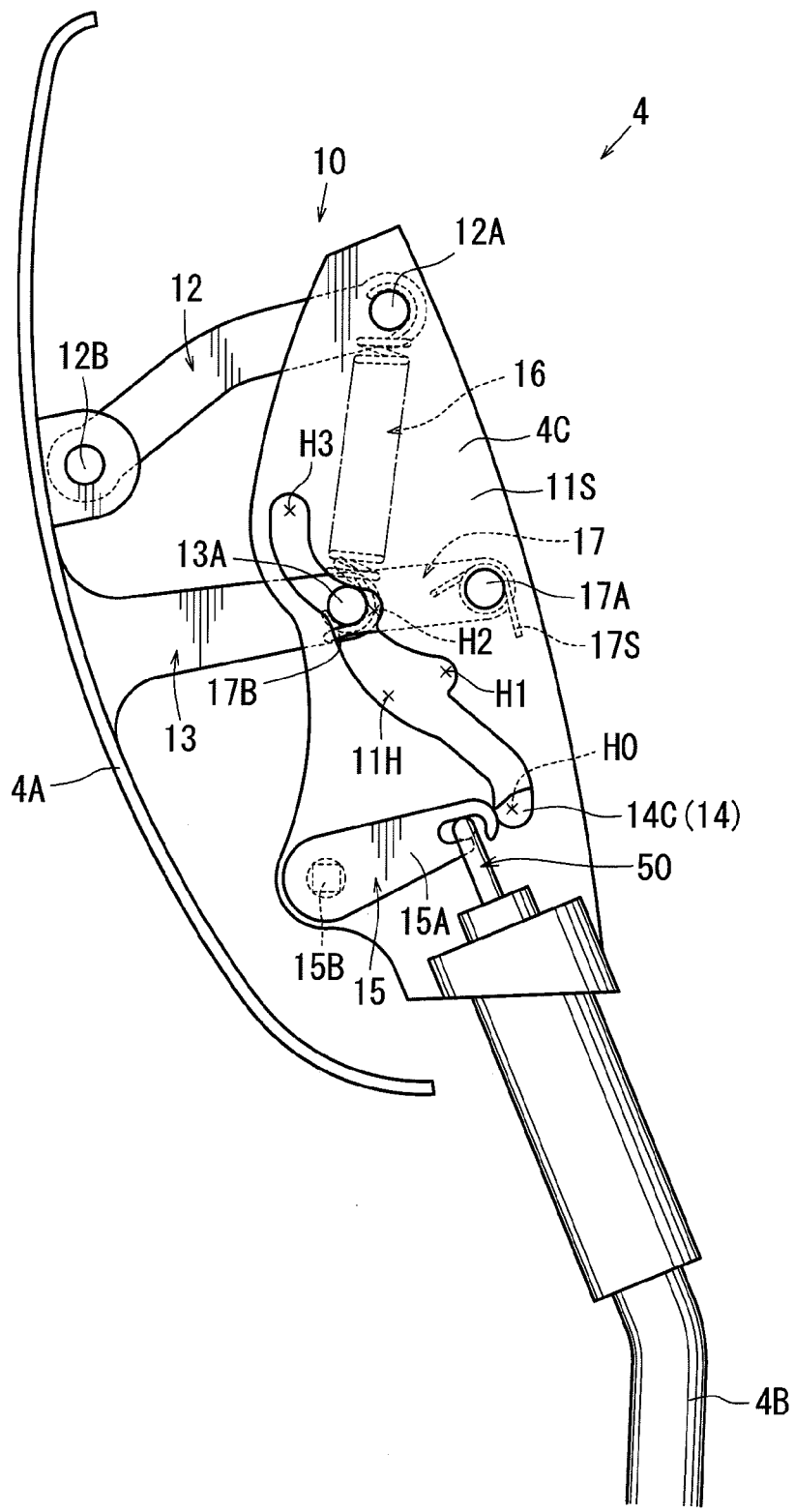
FIG. 10 is a side view of the headrest support portion as being restored to the initial position from the corresponding collision position.

However, as shown in FIG. 9, when the connection shaft 13A reaches the upper end portions H3 and H3 of the elongated holes 11H and 11H, the receiving portions 17B and 17B are restored by the spring action of the torsion springs 17S and 17S to the attitude in which they are exposed in the elongated holes 11H and 11H. And, as shown in FIG. 10, when the connection shaft 13A is transferred downwards within the elongated holes 11H and 11H from the upper end portions H3 and H3, the receiving portions 17B and 17B catch the connection shaft 13A by their spoon-shaped distal ends.

Figure 11:
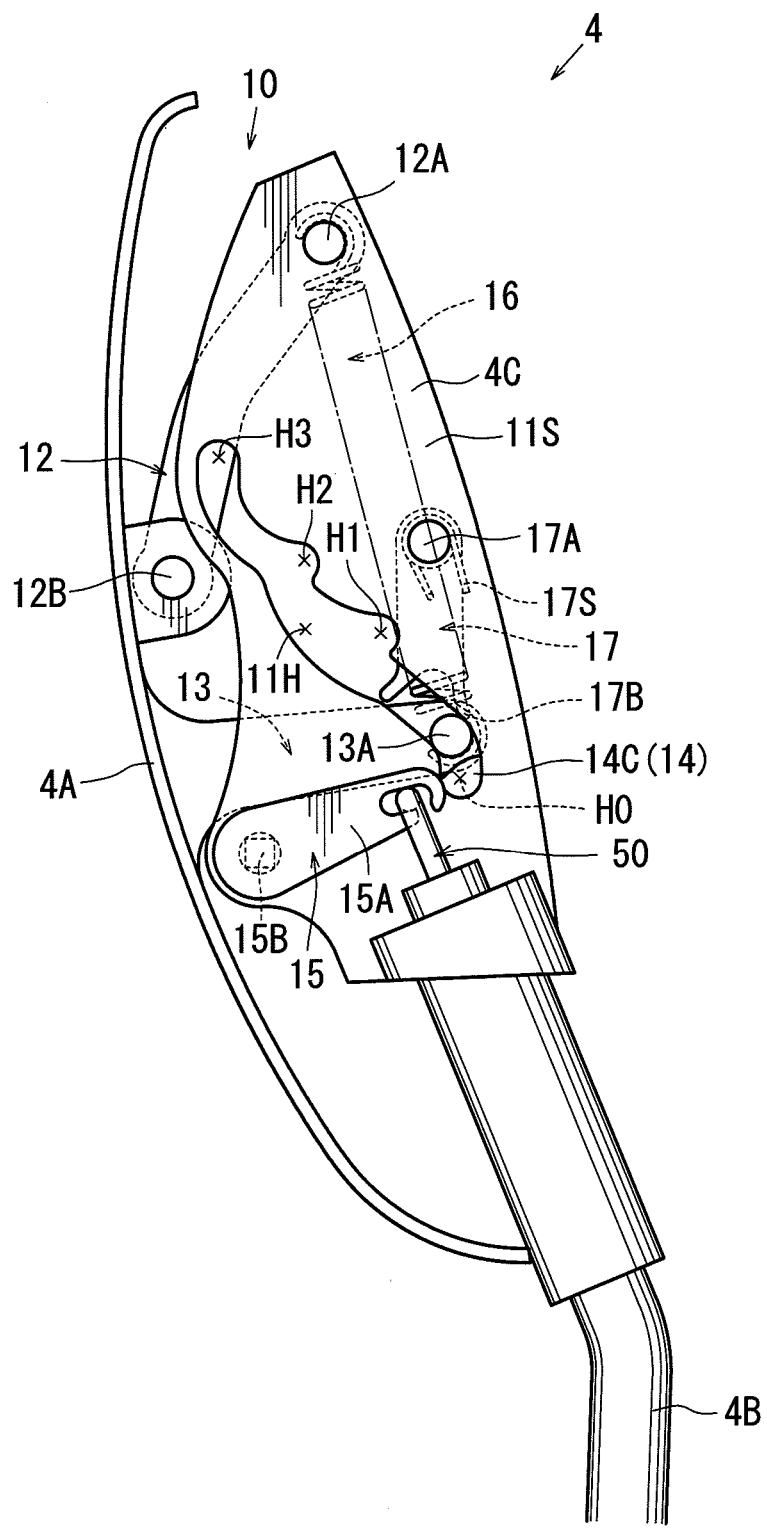
FIG. 11 is a side view of the headrest support portion as guided toward the initial position.

And, when, from this state, the connection shaft 13A is transferred further downwards, the lever members 17 and 17 are pushed and rotated counterclockwise as seen in the drawing while pushed by the connection shaft 13A caught by the receiving portions 17B and 17B. As a result, as shown in FIG. 11, the connection shaft 13A is transferred to the vicinity of the lower end portions H0 and H0 while moved and guided by the lever members 17 and 17 before being detached from the receiving portions 17B and 17B.

In this way, when it is transferred downwards within the elongated holes 11H and 11H from the upper end portions H3 and H3, the connection shaft 13A is smoothly transferred to the lower end portions H0 and H0 while guided by the lever members 17 and 17 so that it may not enter the first stopper grooves H1 and H1 or the second stopper grooves H2 and H2. And, the connection shaft 13A is operated so as to be forced into the lower end portions H0 and H0 of the elongated holes 11H and 11H, whereby the connection shaft 13A reaches the lower end portions H0 and H0 while pushing down the lower jaw portions 14C and 14C of the hooks 14 and 14 exposed at the lower end portions H0 and H0.

As a result, as shown in FIG. 7, the hooks 14 and 14 are pushed and rotated clockwise as seen in the drawing, and an attitude is attained in which their upper jaw portions 14B and 14B have been rotated to the upper side of the connection shaft 13A. And, when the above-mentioned attitude has been attained, the hooks 14 and 14 are engaged with the engagement arm portions 15C and 15C, and lock is effected again, with the connection shaft 13A being retained at the initial position. As a result, the support portion 4A is again restored to and maintained in the initial attitude prior to its forward movement.

Next, a method of using this embodiment will be described. Referring to FIG. 1, in the normal state prior to occurrence of rearward collision of the vehicle, the vehicle seat 1 is in a state in which the support portion 4A of the headrest 4 is maintained in the initial attitude. And, when rearward collision of the vehicle occurs, the pressure receiving plate 21 is pushed backwards by the backrest load from the seated occupant leaning against the seat back 2, and this operational force is transmitted via the operation cable 40 and the push rod 50 to rotate the engagement/disengagement member 15.

As a result, the retention of the support portion 4A at the initial position is canceled, and, as shown in FIG. 9, the support portion 4A is moved to the corresponding collision position shown in the drawing by the urging force of the tension spring 16. And, as the head of the seated occupant is tilted backwards by momentum at the time of rearward collision, the head is received from behind by the support portion 4A having moved to the corresponding collision position.

In this way, in the cable connection structure of this embodiment, through the movement of inserting the stays 4B into the tubes of the fit-tube portions 73S of the ascent/descent body, the engagement protrusions 41P and 41P provided on the inner member 41 (the first cable) of the operation cable 40 can be engaged to the peripherally bent terminal end portions of the reception grooves Bd and Bd formed in one stay 4B (the second cable). As a result, the connection end portions of the cables respectively arranged in the seat back 2 and the ascent/descent type headrest 4 can be firmly connected to each other in the axial direction so that they may not be detached from each other.

Further, as the operation of inserting the stays 4B proceeds, the above-mentioned axial connection and the attachment of the stays 4B to the ascent/descent body 73 are effected stepwise, whereby it is possible to attach the stays 4B to the ascent/descent body 73 by the single action of inserting the stays 4B, with the inner member 41 and the stay 4B being axially connected together reliably.

The present invention, an embodiment of which has been described above, can also be carried out in various other forms. For example, as disclosed in a document such as Japanese Laid-Open Patent Publication No. 2005-104259, it is also possible to construct the headrest moving mechanism such that the support portion of the headrest is moved in the advancing direction directly by an amount corresponding to the amount by which both cables are moved through cable operation.

Further, while in the above-described embodiment the second cable is formed by the stay itself, it is also possible to arrange a separate cable inside the tube of this stay. Further, the insertion grooves formed in the fit-tube portion of the ascent/descent body may be configured so as to be gently curved peripherally such that the terminal end portions thereof are upwardly directed. Due to this construction, the engagement protrusions can be smoothly inserted up to the terminal end positions of the insertion grooves through a simple operation of inserting the operation cable straight in the axial direction, so that there is no need to peripherally turn the operation cable, thereby facilitating the operation. It should be noted, however, that, since the terminal end portions of the insertion grooves are upwardly directed, the operation cable temporarily retained is subject to be easily detached.

Further, while in the above embodiment the insertion grooves are formed as through-holes in the peripheral wall of the fit-tube portion of the ascent/descent body, the insertion grooves may also be formed as recesses in the inner peripheral wall of the fit-tube portion. Further, the engagement protrusions provided on the inner member of the operation cable and the insertion grooves and the reception grooves to be engaged with the engagement protrusions may also be formed at one or three or more peripheral positions. Further, as disclosed in Japanese Laid-Open Patent Publication No. 2005-304565, mentioned as Patent Document in the prior-art section, it is also possible for the ascent/descent device to be raised and lowered in synchronization with the longitudinal sliding movement of the vehicle seat. In this construction, as disclosed in the above-mentioned document, when, for example, a tall occupant seats himself in the vehicle seat, it is possible to increase the height of the headrest to adjust the head support position to the physical constitution of the seated occupant in synchronization with the movement to cause the vehicle seat to slide rearwards to increase the footrest space.

Further, while in the above-described embodiment the headrest is integrally attached to the ascent/descent device through the stay inserting operation, it is also possible for the headrest to be constructed so as to be capable of being freely inserted and extracted with respect to the ascent/descent device. In this case, by performing the operation of extracting the stays from the fit-tube portions of the ascent/descent body, the axial connection of the inner member of the operation cable and the stay is canceled through a movement reverse to that of the above-described embodiment, and the headrest is detached from the seat back, with the inner member being again restored to the temporary retention state in which it is suspended inside the tube of the fit-tube portion.

The invention claimed is:

1. A cable connection structure for a vehicle seat comprising:
a first cable and a second cable are connected to each other via a tubular connection member whose axial movement is regulated;
a first cable connection end portion provided with an engagement protrusion extending radially outward; a second cable connection end portion formed with a reception groove axially extending and capable of axially receiving the engagement protrusion; wherein:
the first cable connection end portion is inserted into a tube of the connection member from one axial side, whereby the engagement protrusion is axially received along a configuration of an insertion groove formed in a tube wall of the connection member;
an axial terminal end portion of the insertion groove receiving the engagement protrusion is configured to be bent in one peripheral direction, the engagement protrusion is inserted into the terminal end portion of the insertion groove and retained so movement is regulated in both axial directions with respect to the connection member;
the second cable connection end portion includes a reception groove which receives the engagement protrusion and whose axial terminal end portion is configured so as to be bent in another peripheral direction that is opposite to the direction in which the insertion groove is bent, the second cable connection end portion is inserted into a tube of the connection member from the other axial side to thereby cause the engagement protrusion of the first cable retained in the tube to be received along a configuration of the reception groove of the second cable, the engagement protrusion is inserted into the terminal end portion of the reception groove bent in the other peripheral direction to thereby cause the engagement protrusion to be detached from the terminal end portion of the insertion groove of the connection member to cancel the regulation of axial movement of the engagement protrusion with respect to the connection member, with transition being effected to a state in which axial movement of the engagement protrusion with respect to the second cable is regulated;
in a state in which the engagement protrusion has reached to the terminal end portion of the reception groove of the second cable to be regulated in its axial movement, the two cables are connected to each other axially and integrally to be axially moved and operated integrally, with the engagement protrusion being retained at the terminal end portion of the reception groove due to the axially extending groove configuration of the insertion groove formed in the connection member;

the first cable is arranged inside a seat back, the tubular connection member into whose tube the connection end portion of the first cable is inserted for retention is provided on an ascent/descent body provided so as to be capable of ascending and descending with respect to the seat back; a stay serving as a support for a headrest is inserted into and attached to the ascent/descent body, the second cable is arranged so as to be inserted into a tube of the stay from within the headrest, and the stay of the headrest is inserted from above into the seat back to be attached to the ascent/descent body while inserted into the tube of the connection member provided integrally with the ascent/descent body, thereby connecting the two cables axially to each other.

2. A cable connection structure as in claim 1, wherein:
in the state in which the two cables are axially and integrally connected to each other through the operation of inserting the stay of the headrest, the two cables are moved and operated integrally in the same direction as the stay is further moved in the inserting direction; and
as the stay is further moved in the inserting direction from the state in which the two cables are axially connected to each other, the stay is integrally engaged with the ascent/descent body.

* * * * *